United States Patent
Shim et al.

(10) Patent No.: US 11,778,597 B2
(45) Date of Patent: Oct. 3, 2023

(54) METHOD AND APPARATUS FOR PERFORMING FUNCTION SPLIT IN WIRELESS COMMUNICATION SYSTEM

(71) Applicant: Samsung Electronics Co., Ltd., Suwon-si (KR)

(72) Inventors: Seijoon Shim, Suwon-si (KR); Sitae Kim, Suwon-si (KR); Chanho Choi, Suwon-si (KR); Seongyong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 16/887,287

(22) Filed: May 29, 2020

(65) Prior Publication Data
US 2021/0058925 A1    Feb. 25, 2021

(30) Foreign Application Priority Data

Aug. 19, 2019   (KR) .......................... 10-2019-0101337

(51) Int. Cl.
H04W 72/04      (2023.01)
H04W 72/0446    (2023.01)
H04B 7/0413     (2017.01)

(52) U.S. Cl.
CPC ...... *H04W 72/0446* (2013.01); *H04B 7/0413* (2013.01)

(58) Field of Classification Search
CPC ....... H04I 27/00; H04L 27/2634; H04L 5/023
See application file for complete search history.

(56) References Cited

U.S. PATENT DOCUMENTS

| 10,135,599 B2 | 11/2018 | Wolff et al. |
| 10,248,607 B1 | 4/2019 | Davis et al. |
| 10,277,440 B1 * | 4/2019 | Sethi .................. H04L 27/2613 |

(Continued)

FOREIGN PATENT DOCUMENTS

| WO | 2018-024472 A1 | 2/2018 |
| WO | 2018/225988 A1 | 12/2018 |

OTHER PUBLICATIONS

Line et al., A Survey of the Functional Splits Proposed for 5G Mobile Crosshaul Networks; IEEE Communications Surveys & Tutorials, vol. 21, No. 1, First Quarter 2019.

(Continued)

*Primary Examiner* — Jung Liu
(74) *Attorney, Agent, or Firm* — Jefferson IP Law, LLP

(57) ABSTRACT

A base station for transmitting data to a terminal in a wireless communication system is provided. The base station includes a transceiver, a storage, and a controller including a first control unit and a second control unit, wherein the controller is configured to perform, by the first control unit, data packing on bit unit information including information related to the data and information related to a modulation type, transmit, by the first control unit, the bit unit information on which the data packing is performed and additional information to the second control unit, modulate, by the second control unit, the data based on the bit unit information on which the data packing is performed, and generate, by the second control unit, a signal to be transmitted to the terminal, based on the modulated data and the additional information.

13 Claims, 13 Drawing Sheets

(56) References Cited

U.S. PATENT DOCUMENTS

| | | | |
|---|---|---|---|
| 2013/0322563 A1* | 12/2013 | Van Zelst | H04L 27/2621 |
| | | | 375/295 |
| 2017/0238361 A1 | 8/2017 | Pawar et al. | |
| 2018/0042003 A1* | 2/2018 | Chen | H04W 72/21 |
| 2018/0279315 A1* | 9/2018 | Salem | H04L 1/0072 |
| 2019/0007246 A1 | 1/2019 | Fertonani et al. | |
| 2019/0098611 A1* | 3/2019 | Shimezawa | H04W 28/06 |
| 2019/0174561 A1* | 6/2019 | Sivavakeesar | H04W 48/12 |
| 2019/0319765 A1* | 10/2019 | El Mghazli | H04L 5/0053 |
| 2020/0145873 A1 | 5/2020 | Park et al. | |
| 2021/0105125 A1* | 4/2021 | Rajagopal | H04L 5/0048 |

OTHER PUBLICATIONS

International Search Report dated Aug. 26, 2020, issued in an International Application No. PCT/KR2020/007070.

Chia-Yu Chang et al., 'FlexCRAN: A Flexible Functional Split Framework over Ethernet Fronthaul in Cloud-RAN', 2017 IEEE International Conference on Communications (ICC), Jul. 31, 2017 sections III-V.

Ericsson AB et al., 'Common Public Radio Interface: eCPRI Interface Specification', eCPRI Specification V2.0, May 10, 2019 [retrieved on Aug. 12, 2020], Retrieved from <http://www.cpri.info/spec.html> pp. 20, 62-77.

Extended European Search Report dated Jul. 21, 2022, issued in a counterpart European Application No. 20854806.5.

Korean Office Action with English translation dated Oct. 27, 2022; Korean Appln. No. 10-2019-0101337.

Korean Office Action dated Apr. 10, 2023, issued in Korean Patent Application No. 10-2019-0101337.

\* cited by examiner

METHOD AND APPARATUS FOR PERFORMING FUNCTION SPLIT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0101337, filed on Aug. 19, 2019, in the Korean Intellectual Property Office, the disclosure of which is incorporated by reference herein in its entirety.

BACKGROUND

1. Field

The disclosure relates to a method and apparatus for performing function split in a wireless communication system.

2. Description of Related Art

To meet the increase in demand with respect to wireless data traffic after the commercialization of $4^{th}$ generation (4G) communication systems, considerable efforts have been made to develop improved $5^{th}$ generation (5G) communication systems or pre-5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz In order to reduce path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

With the recent increasing demand for various services, a transmission amount of mobile data is increasing. To support high speed and high capacity data transmission, a function split structure between central unit (CU) and distributed unit (DU) is being discussed in the 5G communication system. In this regard, various methods are studied to reduce a bandwidth of an interface between CU and DU.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for performing function split in a wireless communication system.

Another aspect of the disclosure is to provide a method and apparatus for reducing a bandwidth of an interface between a central unit (CU) and a distributed unit (DU) in a wireless communication system.

Another aspect of the disclosure is to provide a method and apparatus for simplifying a structure of a DU in a wireless communication system.

Another aspect of the disclosure is to provide a method and apparatus for transmitting and receiving data between a CU and a DU in a wireless communication system.

Additional aspects will be set forth in part in the description which follows and, in part, will be apparent from the description, or may be learned by practice of the presented embodiments.

In accordance with an aspect of the disclosure, a base station, for transmitting data to a terminal in a wireless communication system is provided. The base station includes a transceiver, a storage, and a controller including a first control unit and a second control unit, wherein the controller is configured to control the first control unit to perform data packing on bit unit information including information related to the data and information related to a modulation type, transmit, by the first control unit, the bit unit information on which the data packing is performed and additional information to the second control unit, modulate, by the second control unit, the data based on the bit unit information on which the data packing is performed, generate, by the second control unit, a signal to be transmitted to the terminal, based on the modulated data and the additional information, and transmit, by the second control unit, the generated signal to the terminal.

In accordance with another aspect of the disclosure, a first control unit, included in a base station for transmitting data to a terminal is provided. The first control unit includes a transceiver, a storage, and a controller configured to perform data packing on bit unit information including information related to the data and information related to a modulation type, and transmit, to a second control unit, the bit unit information on which the data packing is performed and additional information, wherein a signal to be transmitted to the terminal is generated based on the additional information and data modulated based on the bit unit information on which the data packing is performed.

In accordance with another aspect of the disclosure, a second control unit, included in a base station for transmitting data to a terminal is provided. The second control unit includes a transceiver, a storage, and a controller configured to receive, from a first control unit, bit unit information on which data packing is performed and additional information, modulate the data based on the bit unit information on which the data packing is performed, generate a signal to be transmitted to the terminal, based on the modulated data and the additional information, and transmit the generated signal to the terminal, wherein the bit unit information on which the data packing is performed includes information related to the data and information related to a modulation type.

In accordance with another aspect of the disclosure, a method, performed by a base station including a first control unit and a second control unit, of transmitting data to a terminal in a wireless communication system is provided. The method includes performing, by the first control unit, data packing on bit unit information including information related to the data and information related to a modulation type, transmitting, by the first control unit, the bit unit information on which the data packing is performed and additional information to the second control unit, modulating, by the second control unit, the data based on the bit unit information on which the data packing is performed, generating, by the second control unit, a signal to be transmitted to the terminal, based on the modulated data and the additional information, and transmitting, by the second control unit, the generated signal to the terminal.

In accordance with another aspect of the disclosure, an operating method of a first control unit included in a base station for transmitting data to a terminal is provided. The operating method includes performing data packing on bit unit information including information related to the data and information related to a modulation type, and transmitting the bit unit information on which the data packing is performed and additional information to a second control unit, wherein a signal to be transmitted to the terminal is generated based on the additional information and the data modulated based on the bit unit information on which the data packing is performed.

In accordance with another aspect of the disclosure, an operating method of a second control unit included in a base station for transmitting data to a terminal is provided. The operating method includes receiving, from a first control unit, bit unit information on which data packing is performed and additional information, modulating the data based on the bit unit information on which the data packing is performed, generating a signal to be transmitted to the terminal, based on the modulated data and the additional information, and transmitting the generated signal to the terminal, wherein the bit unit information on which the data packing is performed includes information related to the data and information related to a modulation type.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
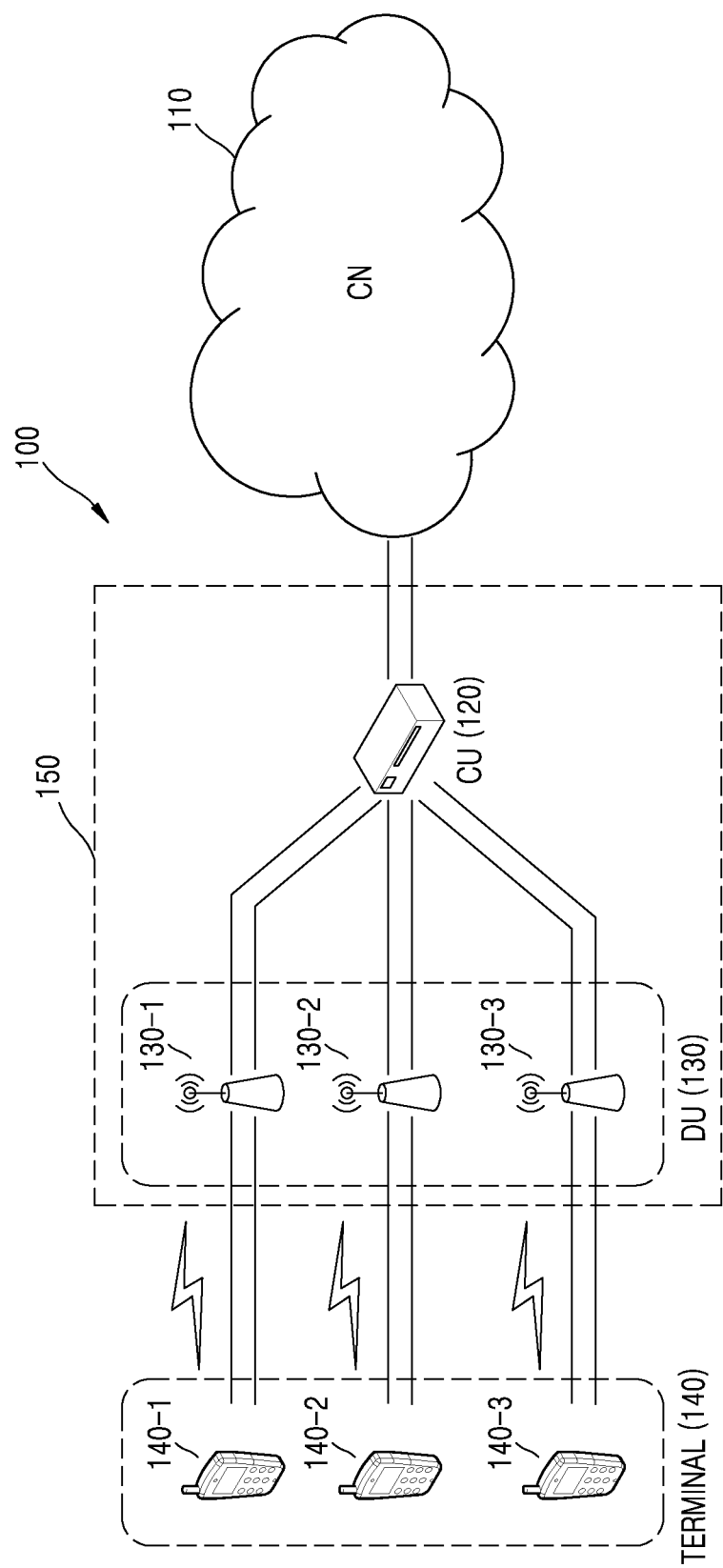
FIG. 1 is a diagram for describing a structure of a wireless communication system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, components may be exaggerated, omitted, or schematically illustrated in drawings for clarity. Also, the size of each component does not completely reflect the actual size. In the drawings, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" used in the embodiments of the disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Embodiments of the disclosure will be described mainly based on a new radio access network (RAN) (new radio (NR)) on the $5^{th}$ generation (5G) mobile communication standard specified by the $3^{rd}$ generation partnership project (3GPP) that is a standardization organization for mobile communication standards, and a packet core (5G system, 5G core network, or next generation (NG) core) that is a core network. However, it will be obvious to one of ordinary skill in the art that the main subject matter of the disclosure is applicable to other communication systems having a similar technical background, with a slight modification within a range that is not significantly outside the scope of the disclosure.

In the 5G system, a network data collection and analysis function (NWDAF) that is a network function for providing a function of analyzing and providing data collected in a 5G network may be defined to support network automation. NWDAF may provide results of collecting/storing/analyzing information from the 5G network to an unspecified network function (NF), and the analysis results may be independently used in each NF.

Hereinafter, for convenience of description, some terms and names defined by the 3GPP long term evolution (LTE) standard (standard of 5G, NR, LTE, or similar system) may be used. However, the disclosure is not limited by such terms and names, and may be equally applied to systems conforming to other standards.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings. The disclosure is described based on an LTE system, but may also be applied to other mobile communication systems, such as NR that is a next-generation mobile communication system. For example, in the disclosure, eNB in LTE may correspond to gNB in NR and mobility management entity (MME) in LTE may correspond to access and mobility function (AMF) in NR.

FIG. 1 is a diagram for describing a structure of a wireless communication system 100, according to an embodiment of the disclosure.

Referring to FIG. 1, the wireless communication system 100 may include a core network (CN) 110, a central unit (CU) 120, a distributed unit (DU) 130, a terminal 140, and a base station 150.

The CN 110 may assist communication of the terminal 140 via the CU 120 and the DU 130. For example, the CN 110 may perform authentication, charging, end-to-end connection management, and the like for the terminal 140. Also, the CN 110 may link various wireless access technologies to each other. Also, the CN 110 may assist communication of the terminal 140 by splitting data and control information.

The base station 150 is a network infrastructure providing wireless access to a terminal within coverage. The coverage may be defined as a constant geographic area generated based on a distance at which the base station 150 is capable of transmitting a signal. The base station 150 may be referred to as an eNodeB (eNB), a $5^{th}$ generation (5G) node, a 5G NodeB (NB) or a gNB.

Referring to FIG. 1, the base station 150 includes the CU 120 and the DU 130, but is not limited thereto. For example, the base station 150 of FIG. 1 may denote a logical entity present between the terminal 140 and the CN 110. In other words, the meaning of base station 150 is not limited to a hardware apparatus. Thus, the CU 120 and the DU 130 may be included in the base station 150 or may not be included in the base station 150. For example, both the CU 120 and the DU 130 may be included in the base station 150. Also, the CU 120 may be present outside the base station 150 and the DU 130 may be present inside the base station 150. Alternatively, the CU 120 may be present inside the base station 150 and the DU 130 may be present outside the base station 150. Alternatively, both the CU 120 and the DU 130 may be present outside the base station 150. For convenience of description, it will be described that the CU 120 and the DU 130 are included in the base station 150 in the disclosure.

In a general communication method, as a centralized/cloud radio access network (C-RAN), a base station is divided into a digital unit and a radio unit, wherein functions of packet data convergence protocol (PDCP), radio link control (RLC), media access control (MAC), and physical (PHY) are performed in the digital unit and only a function of radio frequency (RF) is performed in the radio unit. However, with the development of a communication technology, mobile data traffic increased and accordingly, demands for a bandwidth required in a fronthaul between the digital unit and the radio unit have significantly increased.

Hereinafter, in the disclosure, a fronthaul function split is applied to reduce the bandwidth in the fronthaul. Here, the fronthaul function split denotes that the functions of PDCP, RLC, MAC, PHY, and RF are configured separately in a CU and a DU. For example, the CU 120 may perform the functions of RRC and PDCP, and the DU 130 may perform the functions of RLC, MAC, PHY, and RF. As for another example, the CU 120 may perform the functions of RRC, PDCP, RLC, and MAC, and the DU 130 may perform the functions of PHY and RF. According to an embodiment of the disclosure, the fronthaul may denote an interface between the CU 120 and the DU 130.

The CU 120 may provide a service to terminals (for example, the terminal 140) in a region within coverage providable by distributed units (for example, the DU 130) connected to the CU 120. According to an embodiment of the disclosure, the CU 120 may be implemented as software according to a virtualization technology. The CU 120 may be referred to as a cloud unit, a baseband unit (BBU), a digital unit, an open radio access network control unit (O-RAN CU) (O-CU), an open radio access network distributed unit (O-RAN DU) (O-DU), or another term having the same technical meaning.

The DU 130 may provide a service to terminals (for example, the terminal 140) of a region within coverage providable by the DU 130. The DU 130 may be provided at a cell site by being implemented as hardware to provide an access network to the terminal 140. According to an embodiment of the disclosure, the virtualization technology may be applied to some functions of the DU 130, like the CU 120. The DU 130 may be referred to as an access unit (AU), an access point (AP), a transmission/reception point (TRP), a remote radio head (RRH), a radio unit (RU), an open radio access network distributed unit (O-RAN DU) (O-DU), an open radio access network radio unit (O-RAN RU) (O-RU), or another term having the same technical meaning.

The terminal 140 is an apparatus used by a user and performs communication with the DU 130 via a wireless channel. In some cases, the terminal 140 may be operated without the user's involvement. For example, the terminal 140 may be an apparatus performing machine type communication (MTC) and may not be carried by the user. The terminal 140 may be referred to as, in addition to a terminal, a user equipment (UE), a mobile station, a subscriber station, a customer premises equipment (CPE), a remote terminal, a wireless terminal, an electronic device, a user device, or another term having the same technical meaning. A terminal (for example, the terminal 140) according to an embodiment of the disclosure may include at least one of a smart phone, a tablet personal computer (PC), a mobile phone, a video phone, an electronic book reader, a desktop PC, a laptop PC, a net book computer, a medical device, a camera, or a wearable device.

Referring to FIG. 1, the DU 130 may include a plurality of DUs. For example, the DU 130 may include a first DU 130-1, a second DU 130-2, and a third DU 130-3. In FIG. 1, three DUs are illustrated but the number of DUs is not limited thereto. In other words, m DUs may be present, wherein m is an integer greater than 1. In FIG. 1, the CU 120 is illustrated as one entity, but the number of CUs is not limited thereto.

Referring to FIG. 1, the CU 120 and the three DUs (the first DU 130-1, the second DU 130-2, and the third DU 130-3) included in the DU 130 are connected to each other such that signaling is performed. For example, the CU 120 and the first DU 130-1 may be connected to each other such that signaling is performed, the CU 120 and the second DU 130-2 may be connected to each other such that signaling is performed, and the CU 120 and the third DU 130-3 may be connected to each other such that signaling is performed. However, the disclosure is not limited thereto. For example, according to an embodiment of the disclosure, n CUs and m DUs may be connected to each other such that signaling is performed, wherein n is an integer greater than 1 and m is an integer greater than 1.

According to an embodiment of the disclosure, the terminal 140 may include a plurality of terminals. For example, the terminal 140 may include a first terminal 140-1, a second terminal 140-2, and a third terminal 140-3. In FIG. 1, three terminals are illustrated but the number of terminals is not limited thereto. In other words, k terminals may be present, wherein k is an integer greater than 1 According to an embodiment of the disclosure, UEs may transmit and receive a signal to and from a respective DU. For example, a signal may be transmitted and received between the first terminal 140-1 and the first DU 130-1, between the second terminal 140-2 and the second DU 130-2, and between the third terminal 140-3 and the third DU 130-3. However, the disclosure is not limited thereto.

Although not shown in FIG. 1, an O-CU capable of performing functions of PDCP, RRC, and service data application protocol (SDAP), an O-DU capable of performing functions of RLC, MAC, and high-PHY, and an O-RU capable of performing functions of low-PHY and RF may be configured between the CN 110 and the terminal 140. Here, the O-CU, the O-DU, and the O-RU may denote a logical node defined in the O-RAN standard.

Hereinafter, an efficient function split method between the CU 120 and the DU 130 will be described based on such a structure of the wireless communication system 100.

Figure 2:
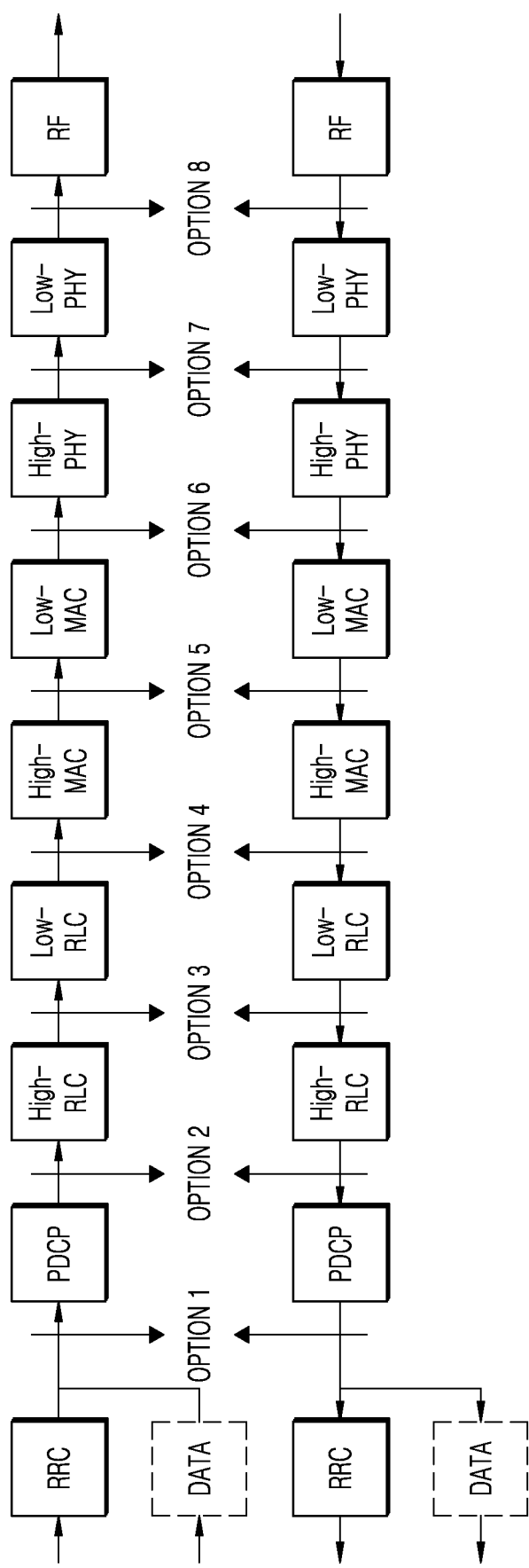
FIG. 2 illustrates an example of a function split structure between a central unit (CU) and a distributed unit (DU), according to an embodiment of the disclosure.

With the development of a communication technology, demands for various services have recently increased. Due to the increasing demands for various services, a data rate has increased and thus a large-capacity interface between a CU and a DU is required. Generally, the interface between the CU and the DU is a physical medium and thus, is implemented as an optical fiber, and accordingly, the increase in a bandwidth of the interface between the CU and the DU for supporting a high-speed and large-capacity data rate may directly cause an increase in costs. In this regard, studies on a function split point are actively performed to reduce a transmission bandwidth of the interface between the CU and the DU. FIG. 2 illustrates an example of a function split structure.

FIG. 2 illustrates an example of a function split structure between a CU and a DU, according to an embodiment of the disclosure.

Referring to FIG. 2, functional blocks indicating a hierarchical structure for data transmission and reception are illustrated. For example, a configuration in which data is transmitted starting from an RRC functional block that is a higher layer to a PDCP functional block and data is output from an RF functional block that is a lower layer shows a transmission process of data. Also, a configuration in which data is output starting from the RF functional block that is a lower layer and from the PDCP functional block that is a higher layer shows a reception process of data.

Referring to FIG. 2, function split options from option 1 to option 8 are present according to function split points between the CU and the DU. For example, function split between RRC and PDCP may be defined as option 1, function split between PDCP and high-RLC may be defined as option 2, function split between high-RLC and low-RLC may be defined as option 3, function split between low-RLC and high-MAC may be defined as option 4, function split between high-MAC and low-MAC may be defined as option 5, function split between low-MAC and high-PHY may be defined as option 6, function split between high-PHY and low-PHY may be defined as option 7, and function split between low-PHY and RF may be defined as option 8. Among such various options, between option 7 and option 8, i.e., intra PHY function split, may be suitable for function split between the CU and the DU considering implementation convenience and complexity of transmission and reception algorithms.

According to an embodiment of the disclosure, the intra PHY function split may be classified into three types based on a functional definition. First, in option 7-1, a function such as fast Fourier transform (FFT)/inverse fast Fourier transform (IFFT), cyclic prefix (CP) removal/CP addition, or physical random access channel (PRACH) filtering may be performed in the DU, and reception algorithms that are complicated and have excellent reception performance such as channel estimation, multi-input multi-output (MIMO) detection, and channel decoding may be performed in the CU. Accordingly, a structure of the DU may be simplified.

In option 7-2, in the case of uplink (UL), functions such as FFT, CP removal, resource de-mapping, and pre-filtering may be performed in the DU and remaining PHY functions may be performed in the CU. In the case of downlink (DL), functions such as IFFT, CP addition, resource mapping, and precoding may be performed in the DU and remaining PHY functions may be performed in the CU. When option 7-2 is used, capacity of backhaul may be reduced. According to an embodiment of the disclosure, option 7-2 may include a structure of option 7-2a based on precoding/pre-filtering.

Option 7-3 is a structure present only in DL, wherein an encoder function is provided in the CU and remaining PHY functions are provided in the DU. In option 7-2a among the options described above, a complicated transmission function such as resource mapping is processed in the CU and thus costs of the DU may be reduced. In option 7-2a, digital in-phase and quadrature (I/Q) data may be transmitted from the CU to DU. Here, the digital I/Q data may denote data in which I/Q value to which channel gain is applied is quantized. When the digital I/Q data is transmitted, a transmission bandwidth of an interface between the CU and the DU may be increased. Here, a compression technique may be used to reduce a bandwidth, but when the bandwidth is reduced according to the compression technique, transmission quality may deteriorate.

In option 7-3, lossless transmission is possible as data transmitted from the CU to the DU is transmitted in bit units and the bandwidth of the interface between the CU and the DU is decreased. However, in option 7-3, a structure related to a complicated transmission function needs to be realized in the DU, and thus costs of designing the DU may be increased.

Figure 3:
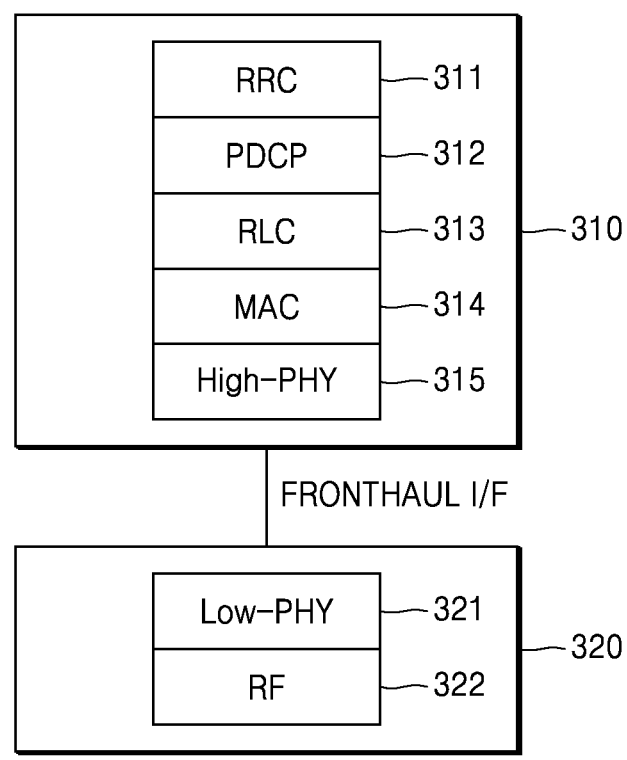
FIG. 3 illustrates an example of a configuration of a fronthaul interface, according to an embodiment of the disclosure.
Figure 4A:
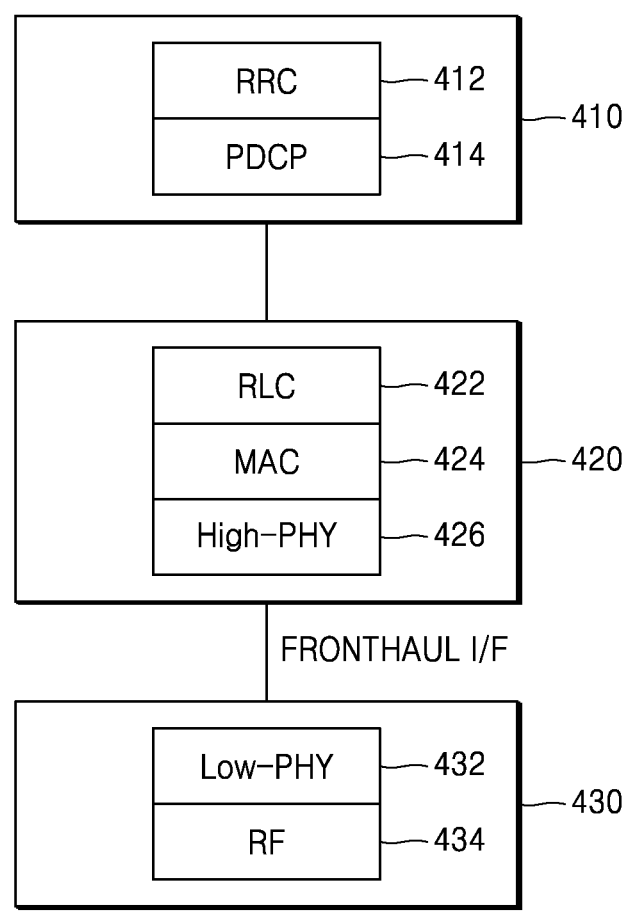
FIG. 4A illustrates an example of a configuration of a fronthaul interface, according to an embodiment of the disclosure.
Figure 4B:
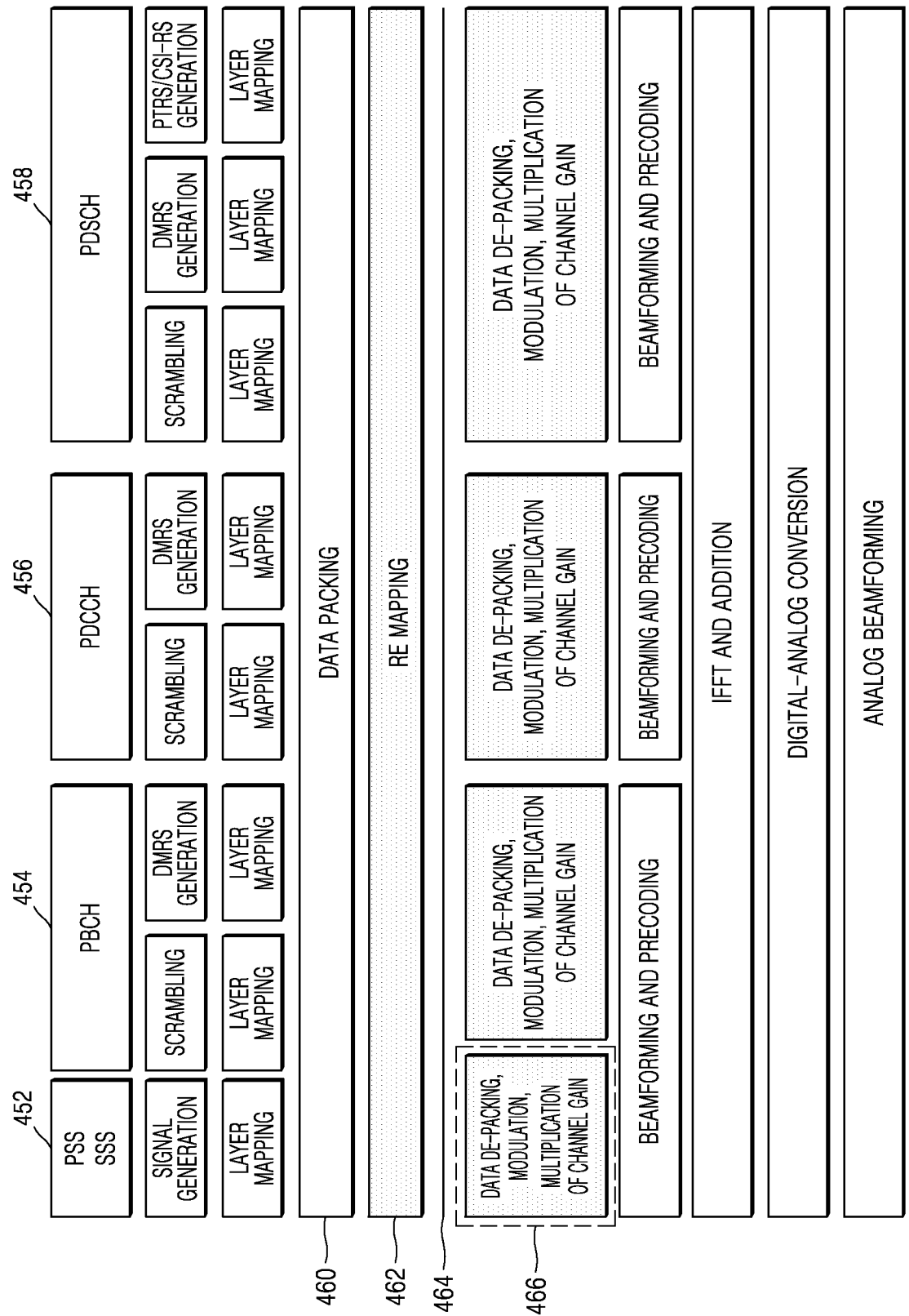
FIG. 4B illustrates a specific example of a function split option according to an embodiment of the disclosure.

Accordingly, the disclosure provides a function split structure and interface capable of using features of options 7-2a and 7-3 among the function split functions described above, i.e., simplification of the structure of DU and the reduced bandwidth of the interface between the CU and the DU. For example, an option of the function split structure according to the disclosure may be similar to option 7-2x of the O-RAN standard. However, embodiments of the disclosure related to the function split structure are not limited to options 7-2a, 7-3, and 7-2x, and may be embodied according to various function split options. FIGS. 3, 4A, and 4B illustrate examples of a function split structure according to the disclosure.

FIG. 3 illustrates an example of a configuration of a fronthaul interface, according to an embodiment of the disclosure. According to an embodiment of the disclosure, a first control unit 310 and a second control unit 320 of FIG. 3 may be included in the base station 150 of FIG. 1. However, an embodiment of the disclosure is not limited thereto.

Referring to FIG. 3, the first control unit 310 may include an RRC function 311, a PDCP function 312, an RLC function 313, a MAC function 314, and a high-PHY function 315. Also, the second control unit 320 may include a low-PHY function 321 and an RF function 322. According to an embodiment of the disclosure, a fronthaul interface (I/F) may be formed between the first control unit 310 and the second control unit 320. The first control unit 310 and the second control unit 320 may exchange information for processing a packet via the fronthaul I/F.

According to an embodiment of the disclosure, the first control unit 310 may denote the CU 120 of FIG. 1 and the second control unit 320 may denote the DU 130 of FIG. 1. According to another embodiment of the disclosure, the first control unit 310 may denote an O-CU, O-DU, or a sum of the O-CU and the O-DU, and the second control unit 320 may denote an O-RU. However, the meanings of the first control unit 310 and the second control unit 320 are not limited to the above examples.

According to an embodiment of the disclosure, the first control unit 310 may perform encoding, scrambling, data packing, and resource mapping on data to be transmitted to the terminal 140. After performing the resource mapping, the first control unit 310 may transmit data in bit units to the second control unit 320. Also, the first control unit 310 may transmit additional information related to data modulation to the second control unit 320. The second control unit 320 may generate a signal to be transmitted to the terminal 140, based on the received data in bit units and the additional information. Also, the second control unit 320 may perform operations such as precoding, IFFT, and CP addition.

FIG. 4A illustrates an example of a configuration of a fronthaul I/F, according to an embodiment of the disclosure. According to an embodiment of the disclosure, a third control unit 410, a fourth control unit 420, and a fifth control unit 430 of FIG. 4A may be included in the base station 150 of FIG. 1. However, an embodiment of the disclosure is not limited thereto.

Referring to FIG. 4A, the third control unit 410 may include an RRC function 412 and a PDCP function 414, the fourth control unit 420 may include an RLC function 422, an MAC function 424, and a high-PHY function 426, and the fifth control unit 430 may include a low-PHY function 432 and an RF function 434. According to an embodiment of the disclosure, the fourth control unit 420 and the fifth control unit 430 may exchange information for processing a packet via the fronthaul I/F.

According to an embodiment of the disclosure, the third control unit 410 may denote an O-CU, the fourth control unit 420 may denote an O-DU, and the fifth control unit 430 may denote an O-RU. According to another embodiment of the disclosure, the CU 120 of FIG. 1 may include the third control unit 410 and the fourth control unit 420. Also, the DU 130 of FIG. 1 may include the fifth control unit 430. Also, the first control unit 310 of FIG. 3 may include the third control unit 410 and the fourth control unit 420 of FIG. 4A. Also, the second control unit 320 of FIG. 3 may include the fifth control unit 430 of FIG. 4A. However, the meanings of the third control unit 410, the fourth control unit 420, and the fifth control unit 430 are not limited to the above examples.

According to an embodiment of the disclosure, as described above, the fourth control unit 420 may denote the O-DU and the fifth control unit 430 may denote the O-RU. Referring to FIG. 4A, one O-RU is illustrated for one O-DU, but an embodiment of the disclosure is not limited thereto, and a plurality of O-RUs may be connected to one O-DU. A low layer split (LLS) control plane (LLS C-plane) and an LLS user plane (LLS U-plane) are formed between the O-DU and the O-RU via an LLS I/F.

Here, the fourth control unit 420 may perform functions other than functions assigned to the fifth control unit 430 from among functions of an eNB or gNB according to a function split option of the disclosure. Also, the fourth control unit 420 may control operations of the fifth control unit 430.

Also, when the fourth control unit 420 denotes the O-DU and the fifth control unit 430 denotes the O-RU, the fifth control unit 430 may perform some functions of the functions of the eNB or gNB according to a function split option of the disclosure. Here, the fourth control unit 420 may control the fifth control unit 430 and real-time aspects of control and user plane communication with another control unit (for example, the O-RU).

In a function split option according to an embodiment of the disclosure, the high-PHY function 426 may include functions of encoding/decoding and scrambling. Also, the low-PHY function 432 may include functions of modulation/demodulation, FFT/IFFT, precoding, PRACH extraction, and filtering. The high-PHY function 426 and the low-PHY function 432 are not limited to the above examples.

Figure 5:
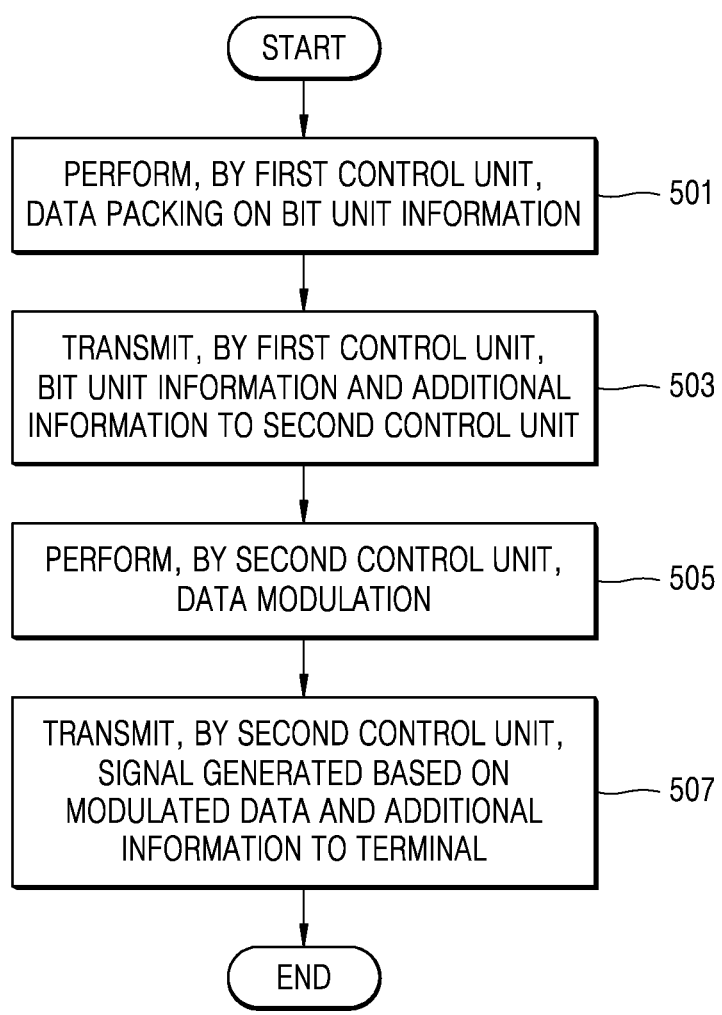
FIG. 5 is a flowchart of operations of a base station, according to an embodiment of the disclosure.
Figure 6:
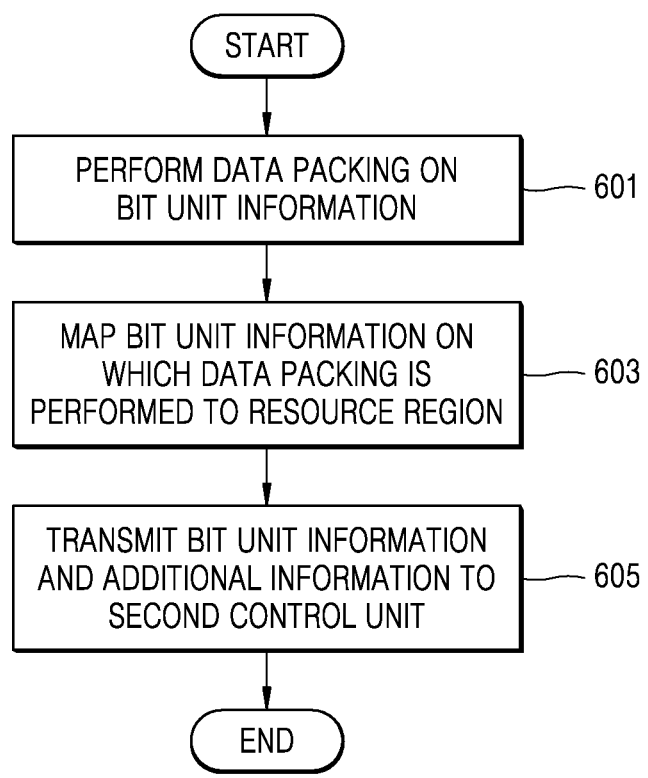
FIG. 6 is a flowchart of operations of a first control unit, according to an embodiment of the disclosure.
Figure 7:
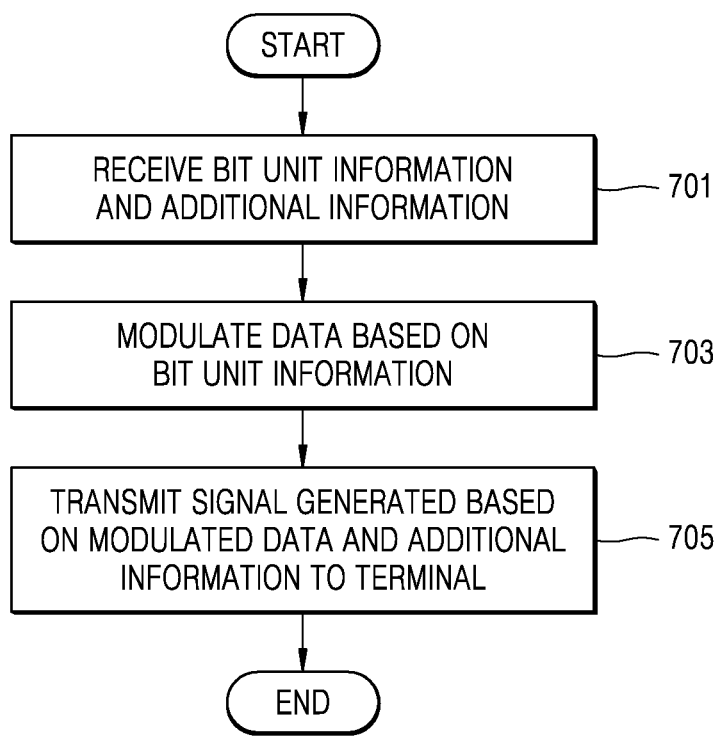
FIG. 7 is a flowchart of operations of a second control unit, according to an embodiment of the disclosure.

According to an embodiment of the disclosure, the fourth control unit 420 may perform encoding, scrambling, and resource mapping on data to be transmitted to the terminal 140. After performing the resource mapping, the fourth control unit 420 may transmit data in bit units to the fifth control unit 430. Also, the fourth control unit 420 may transmit additional information related to data modulation to the fifth control unit 430. The fifth control unit 430 may generate a signal to be transmitted to the terminal 140, based on the received data in bit units and the additional information. Also, the fifth control unit 430 may perform operations such as precoding, IFFT, and CP addition. FIGS. 5 through 7 illustrate an operating method of the base station 150, according to an embodiment of the disclosure.

FIG. 4B illustrates a specific example of a function split option according to an embodiment of the disclosure.

Referring to FIG. 4B, there may be a plurality of signals or channels transmittable from the fourth control unit 420 to the fifth control unit 430. For example, the plurality of signals or channels may include a primary synchronization signal (PSS)/secondary synchronization signal (SSS) 452, a physical broadcast channel (PBCH) 454, a physical downlink control channel (PDCCH) 456, and a physical downlink shared channel (PDSCH) 458.

According to an embodiment of the disclosure, data packing 460 may be performed on the plurality of signals or channels after signal generation, scrambling, and layer mapping. According to an embodiment of the disclosure, the data packing 460 may indicate that bit data transmitted to the fourth control unit 420 and the fifth control unit 430 is compressed. According to an embodiment of the disclosure, the data packing 460 may indicate that bits indicating specific information are compressed in bit units. For example, according to an embodiment of the disclosure, the fourth control unit 420 may perform the data packing 460 on a bit indicating data transmitted by the base station 150 to the terminal 140, a bit indicating a modulation type, or a bit indicating a channel indicator. According to an embodiment of the disclosure, the data packing 460 may denote a compression method included in I/Q (or IQ) compression of option 7-2x of the O-RAN standard.

According to an embodiment of the disclosure, the bit data compressed based on the data packing 460 may be mapped to a resource region. Here, the mapping to the resource region may denote mapping per resource element (RE) in a time and frequency resource region, and may be referred to as RE mapping 462.

According to an embodiment of the disclosure, a fronthaul I/F 464 may be formed between an entity that performs the RE mapping 462 and an entity that performs data de-packing, modulation, and multiplication of channel gain 466. According to an embodiment of the disclosure, functions of the fourth control unit 420 and the fifth control unit 430 may be split based on the fronthaul I/F 464. In other words, the data packing 460 and the RE mapping 462 may be performed by the fourth control unit 420 and the data de-packing, modulation, and multiplication of channel gain 466 may be performed by the fifth control unit 430. According to an embodiment of the disclosure, data de-packing may also be referred to as data un-packing.

According to an embodiment of the disclosure, the data de-packing, modulation, and multiplication of channel gain 466 may be performed on the bit data mapped to the resource region and on which the data packing 460 is performed. According to an embodiment of the disclosure, data de-packing may indicate that the bit data on which the data packing 460 is performed is decompressed and identified. For example, the fifth control unit 430 may receive the bit data mapped to the resource region and on which the data packing 460 is performed from the fourth control unit 420. Then, the fifth control unit 430 may perform the data de-packing on the bit data on which the data packing 460 is performed to identify the bit indicating the data transmitted by the base station 150 to the terminal 140, the bit indicating the modulation type, or the bit indicating the channel indicator.

According to an embodiment of the disclosure, the modulation may indicate that data is modulated based on the bits identified via the data de-packing. For example, the fifth control unit 430 may identify the bit indicating the data transmitted by the base station 150 to the terminal 140 and the bit indicating the modulation type via the data de-packing. The fifth control unit 430 may modulate the bit indicating the data transmitted by the base station 150 to the terminal 140, based on the identified modulation type.

According to an embodiment of the disclosure, multiplication of channel gain may indicate that a channel gain is applied to the modulated data. For example, the fifth control unit 430 may identify the bit indicating the channel indicator via the data de-packing. The fifth control unit 430 may identify a channel of a signal transmitted to the terminal 140, based on the bit indicating the channel indicator. Then, the fifth control unit 430 may identify a channel gain value corresponding to the identified channel, based on additional information received from the fourth control unit 420.

According to an embodiment of the disclosure, the fifth control unit 430 may generate a signal transmitted to the terminal 140, based on the modulated data and the identified channel gain value. For example, the fifth control unit 430 may generate the signal transmitted to the terminal 140 by multiplying the modulated data by the identified channel gain value. According to an embodiment of the disclosure, the modulating of the data transmitted by the base station 150 to the terminal 140 and the generating of the signal transmitted to the terminal 140 by applying the channel gain value to the modulated data may be referred to as modulation mapping. The data may be transmitted to the terminal 140 when beamforming, precoding, IFFT, and CP addition are performed on the data to which the channel gain is applied.

According to an embodiment of the disclosure, the fourth control unit 420 and the fifth control unit 430 may exchange information indicating a data compression method via a C-plane message or a U-plane message. For example, information indicating the data packing 460 or data de-packing of FIG. 4B may be included in the C-plane message. According to an embodiment of the disclosure the C-plane message including the information indicating the data packing 460 or data de-packing may be transmitted between the fourth control unit 420 and the fifth control unit 430. Also, information indicating a compression method (block floating, modulation compression, or mu-algorithm) other than data packing or data de-packing may be included in the C-plane message or the U-plane message.

Hereinafter, in FIGS. 5 through 15, a first control unit may denote the first control unit 310 of FIG. 3 and a second control unit may denote the second control unit 320 of FIG. 3. According to another embodiment of the disclosure, in FIGS. 5 through 15, the first control unit may denote the third control unit 410, the fourth control unit 420, or a combination of the third control unit 410 and fourth control unit 420 of FIG. 4A, and the second control unit may denote the fifth control unit 430 of FIG. 4A. Hereinafter, for convenience of description, the first control unit is the first control unit 310 and the second control unit is the second control unit 320 in FIGS. 5 through 15, but are not limited thereto. Hereinafter, a specific operating method of a base station will be described with reference to FIG. 5.

FIG. 5 is a flowchart of operations of the base station 150, according to an embodiment of the disclosure.

Referring to FIG. 5, in operation 501, the first control unit 310 of the base station 150 may perform data packing on bit unit information. Alternatively, the fourth control unit 420 of the base station 150 may perform the data packing on the bit unit information. According to an embodiment of the disclosure, the bit unit information may include information related to data transmitted by the base station 150 to the terminal 140, information related to a modulation type, and information related to a channel indicator for distinguishing a signal transmitted to the terminal 140 for each transmission channel. For example, the first control unit 310 of the base station 150 may compress a bit indicating the data transmitted by the base station 150 to the terminal 140, a bit indicating the modulation type, and a bit indicating the channel indicator. According to an embodiment of the disclosure, the compressing may denote the data packing.

According to an embodiment of the disclosure, the first control unit 310 of the base station 150 may map the bit unit information on which the data packing is performed to a resource region. Alternatively, the fourth control unit 420 of the base station 150 may map the bit unit information on which the data packing is performed to the resource region. For example, the first control unit 310 or the fourth control unit 420 of the base station 150 may map bits on which data packing is performed respectively to REs in a transmission resource region.

In operation 503, the first control unit 310 of the base station 150 may transmit the bit unit information and additional information to the second control unit 320. In other words, the first control unit 310 of the base station 150 may transmit the bit unit information on which the data packing is performed and the additional information to the second control unit 320. Alternatively, the fourth control unit 420 of the base station 150 may transmit the bit unit information and the additional information to the fifth control unit 430.

Here, the bit unit information on which the data packing is performed may be mapped to a resource region for transmission of data. In other words, the bit unit information mapped to the resource region and on which the data packing is performed, and the additional information may be transmitted from the first control unit 310 or the fourth control unit 420 to the second control unit 320 or the fifth control unit 430.

According to an embodiment of the disclosure, the additional information may include information indicating a channel gain value of a channel where a signal is transmitted or information indicating a location of a mini-slot in a resource region where a signal is transmitted. Here, the location of the mini-slot in the resource region where the signal is transmitted may correspond to the channel gain value of the channel where the signal is transmitted.

In operation 505, the second control unit 320 of the base station 150 may perform data modulation. Also, the fifth control unit 430 of the base station 150 may perform the data modulation. According to an embodiment of the disclosure, the second control unit 320 or the fifth control unit 430 of the base station 150 may perform data de-packing on the bit unit information on which the data packing is performed to identify the information related to the data transmitted by the base station 150 to the terminal 140, the information related to the modulation type, or the information related to the channel indicator for channel distinguishment. For example, the second control unit 320 or the fifth control unit 430 of the base station 150 may identify the bit indicating the data transmitted by the base station 150 to the terminal 140, the bit indicating the modulation type, or the bit indicating the channel indicator. According to an embodiment of the disclosure, the second control unit 320 or the fifth control unit 430 of the base station 150 may modulate the bit indicating the data transmitted by the base station 150 to the terminal 140, based on the identified modulation type.

In operation 507, the second control unit 320 of the base station 150 may transmit a signal generated based on the modulated data and the additional information to the terminal 140. Alternatively, the fifth control unit 430 of the base station 150 may transmit the signal generated based on the modulated data and the additional information to the terminal 140. In other words, the second control unit 320 or the fifth control unit 430 may generate the signal based on the modulated data and the additional information received from the first control unit 310 or the fourth control unit 420. Also, the second control unit 320 or the fifth control unit 430 may transmit the generated signal to the terminal 140.

According to an embodiment of the disclosure, the second control unit 320 or the fifth control unit 430 of the base station 150 may identify a channel of the signal transmitted to the terminal 140, based on the bit indicating the channel indicator. Also, the second control unit 320 or the fifth control unit 430 of the base station 150 may identify a channel gain value corresponding to the identified channel, based on the additional information received from the first control unit 310 or the fourth control unit 420.

The second control unit 320 or the fifth control unit 430 of the base station 150 may generate the signal transmitted to the terminal 140, based on the modulated data and the identified channel gain value. For example, the second control unit 320 or the fifth control unit 430 of the base station 150 may generate the signal transmitted to the terminal 140 by applying (for example, multiplying) the channel gain value to the modulated data. Also, the second control unit 320 or the fifth control unit 430 of the base station 150 may transmit the generated signal to the terminal 140.

According to an embodiment of the disclosure, the second control unit 320 or the fifth control unit 430 of the base station 150 may perform precoding, IFFT, and CP addition, based on the signal to which the channel gain value is applied (for example, the modulated bit data to which the channel gain value is applied), to transmit the generated signal to the terminal 140. Also, the second control unit 320 or the fifth control unit 430 of the base station 150 may transmit the signal to the terminal 140 by performing digital-analog (D/A) conversion and beamforming on the signal on which the CP addition is performed. However, the operations of the base station 150 are not limited thereto and may vary. Hereinafter, a specific operating method of the first control unit 310 included in the base station 150 will be described with reference to FIG. 6.

FIG. 6 is a flowchart of operations of the first control unit 310, according to an embodiment of the disclosure. According to an embodiment of the disclosure, the fourth control unit 420 may operate in the same manner as the operating method of the first control unit 310 of FIG. 6.

Referring to FIG. 6, in operation 601, the first control unit 310 may perform data packing on bit unit information. According to an embodiment of the disclosure, the bit unit information may include information related to data transmitted by the base station 150 to the terminal 140, information related to a modulation type, and information related to a channel indicator for distinguishing a transmission channel of a signal transmitted to the terminal 140. For example, the first control unit 310 may compress a bit indicating the data transmitted by the base station 150 to the terminal 140, a bit indicating the modulation type, and a bit indicating the channel indicator. According to an embodiment of the disclosure, the compressing may denote the data packing.

In operation 603, the first control unit 310 may map the bit unit information on which the data packing is performed to a resource region. For example, the first control unit 310 may map bits on which the data packing is performed respectively to REs in a transmission resource region.

In operation 605, the first control unit 310 may transmit the bit unit information and additional information to the second control unit 320. For example, the first control unit 310 may transmit the bit unit information mapped to the resource region and on which the data packing is performed to the second control unit 320.

According to an embodiment of the disclosure, the additional information may be included in a C-plane of the second control unit 320 and transmitted from the first control unit 310 to the second control unit 320. For example, the additional information may be transmitted to the second control unit 320 by being included in a specific message on a C-plane (for example, C-plane message). According to an embodiment of the disclosure, the additional information may be transmitted to the second control unit 320 by being included in a header of a message on a U-plane (for example, U-plane message) of the first control unit 310 and the second control unit 320. According to an embodiment of the disclosure, the additional information may include a gain value information per channel and symbol location information of a slot per resource block (RB).

As described with reference to FIG. 6, the first control unit 310 may transmit the bit unit information mapped to the resource region and the additional information to the second control unit 320. Hereinafter, an operating method of the second control unit 320 that received the bit unit information and the additional information from the first control unit 310 will be described with reference to FIG. 7.

FIG. 7 is a flowchart of operations of the second control unit 320, according to an embodiment of the disclosure. According to an embodiment of the disclosure, the fifth control unit 430 may operate in the same manner as the operating method of the second control unit 320 of FIG. 7.

Referring to FIG. 7, in operation 701, the second control unit 320 may receive bit unit information and additional information. For example, the second control unit 320 may receive the bit unit information and the additional information transmitted by the first control unit 310 in operation 605 of FIG. 6.

In operation 703, the second control unit 320 may modulate data based on the bit unit information. According to an embodiment of the disclosure, the second control unit 320 may perform data de-packing on the bit unit information on which data packing is performed to modulate the data transmitted to the terminal 140. For example, the second control unit 320 may perform the data de-packing on the bit unit information on which the data packing is performed to identify information related to data transmitted by the base station 150 to the terminal 140, information related to a modulation type, and information related to a channel indicator for channel distinguishment. For example, the second control unit 320 may identify a bit indicating the data transmitted by the base station 150 to the terminal 140, a bit indicating the modulation type, and a bit indicating the channel indicator. According to an embodiment of the disclosure, the second control unit 320 may modulate the bit indicating the data transmitted by the base station 150 to the terminal 140, based on the identified modulation type.

In operation 705, the second control unit 320 may transmit a signal generated based on the modulated data and the additional information to the terminal 140. According to an embodiment of the disclosure, the second control unit 320 may identify a channel gain value based on the identified information indicating the channel indicator and the additional information to generate the signal transmitted to the terminal 140. For example, the second control unit 320 may identify a channel of the signal transmitted to the terminal 140, based on the bit indicating the channel indicator.

According to an embodiment of the disclosure, the additional information may include information indicating a channel gain value of a channel where a signal is transmitted or information indicating a location of a mini-slot in a resource region where a signal is transmitted. Here, the location of the mini-slot in the resource region where the signal is transmitted may correspond to the channel gain value of the channel where the signal is transmitted. The second control unit 320 may identify the channel gain value from the additional information.

For example, when the additional information includes information indicating the channel gain value corresponding to the channel of the signal transmitted to the terminal 140, the second control unit 320 may use the identified information related to the channel indicator together to obtain a gain value of a transmission channel included in the additional information as a gain value of the channel where the signal is transmitted.

According to an embodiment of the disclosure, when the additional information includes the information indicating the location of the mini-slot, the second control unit 320 may determine a location of a mini-slot where the transmitted signal is present and obtain a gain value corresponding to a resource region where the mini-slot is located as the gain value of the channel where the signal is transmitted.

Through the above method, the second control unit 320 may obtain the channel gain value corresponding to the identified channel. Then, the second control unit 320 may generate the signal transmitted to the terminal 140, based on the modulated data and the identified channel gain value. For example, the second control unit 320 may generate the signal transmitted to the terminal 140 by applying (for example, multiplying) the channel gain value to the modulated bit data. Also, the second control unit 320 may transmit the generated signal to the terminal 140.

As described above with reference to FIG. 7, the second control unit 320 may modulate the data by using the bit unit information and the additional information received from the first control unit 310, and generate the signal to be transmitted to the terminal 140 by applying the channel gain value to the modulated data. Hereinafter, a specific operating method of the second control unit 320 will be described with reference to FIGS. 8 and 9.

Figure 8:
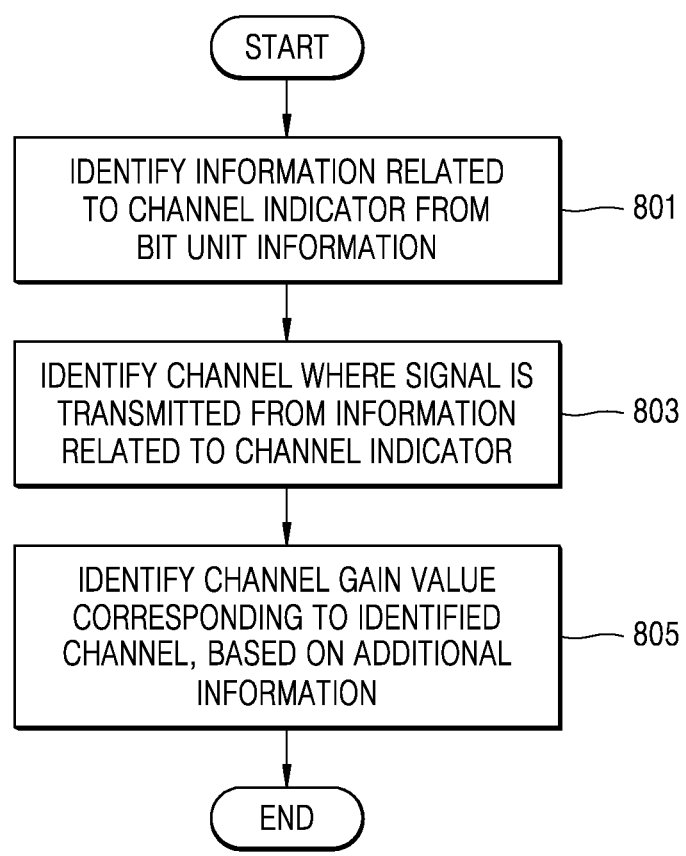
FIG. 8 is a flowchart of operations of identifying a channel gain value, according to an embodiment of the disclosure.

FIG. 8 is a flowchart of operations of identifying a channel gain value, according to an embodiment of the disclosure. According to an embodiment of the disclosure, the operations in FIG. 8 may be performed by the second control unit 320, but are not limited thereto. In other words, according to an embodiment of the disclosure, the fifth control unit 430 may operate in the same manner as the operating method of the second control unit 320 of FIG. 8.

Referring to FIG. 8, in operation 801, the second control unit 320 may identify information related to a channel indicator from bit unit information. For example, the second control unit 320 may identify a bit indicating the channel indicator included in the bit unit information received from the first control unit 310.

In operation 803, the second control unit 320 may identify a channel where a signal is transmitted from the information related to the channel indicator. For example, the second control unit 320 may identify the channel of the signal transmitted by the base station 150 to the terminal 140, based on the bit indicating the channel indicator identified in operation 801. For example, a channel where data is transmitted may include a channel for PSS, a channel for SSS, a channel for PBCH, a channel for PDCCH, or a channel for PDSCH. That is, the channel where data is transmitted may include a channel of a synchronization signal block, a channel of a control region or a channel of a data region.

In operation 805, the second control unit 320 may identify a channel gain value corresponding to the identified channel, based on additional information. For example, as described with reference to operation 705 of FIG. 7, the second control unit 320 may identify the channel gain value corresponding to the identified channel, based on information indicating the channel gain value of the channel where the signal is transmitted or information indicating a location of a mini-slot in a resource region where the signal is transmitted, which is included in the additional information.

According to an embodiment of the disclosure, when the modulation type of the signal transmitted from the first control unit 310 to the second control unit 320 is 16QAM through 1024QAM, the channel gain value of the transmitted signal may denote a channel gain value corresponding to PDSCH. According to another embodiment of the disclosure, when the modulation type of the transmitted signal is quadrature phase shift keying (QPSK), a QPSK modulation method may be used for a transmission channel such as PSS, SSS, PBCH, and PDCCH, in addition to PDSCH. In this case, the channel gain value of the transmitted signal may denote a channel gain value corresponding to each transmission channel.

According to another embodiment of the disclosure, the channel gain value of the transmission channel may be determined based on a location of a mini-slot in an RB. For example, a corresponding channel gain value may be configured for a mini-slot A and a mini-slot B in the RB. The second control unit 320 may determine a location of a mini-slot where the signal transmitted from the first control unit 310 to the second control unit 320 is present, by using the information indicating the location of the mini-slot included in the additional information. The second control unit 320 may obtain the channel gain value corresponding to the mini-slot where the transmitted signal is present. According to an embodiment of the disclosure, the channel gain value may be pre-determined by and stored in the first control unit 310 or the second control unit 320.

The second control unit 320 may generate the signal to be transmitted to the terminal 140, based on the identified channel gain value. Operations of generating the signal will be described in detail with reference to FIG. 9.

Figure 9:
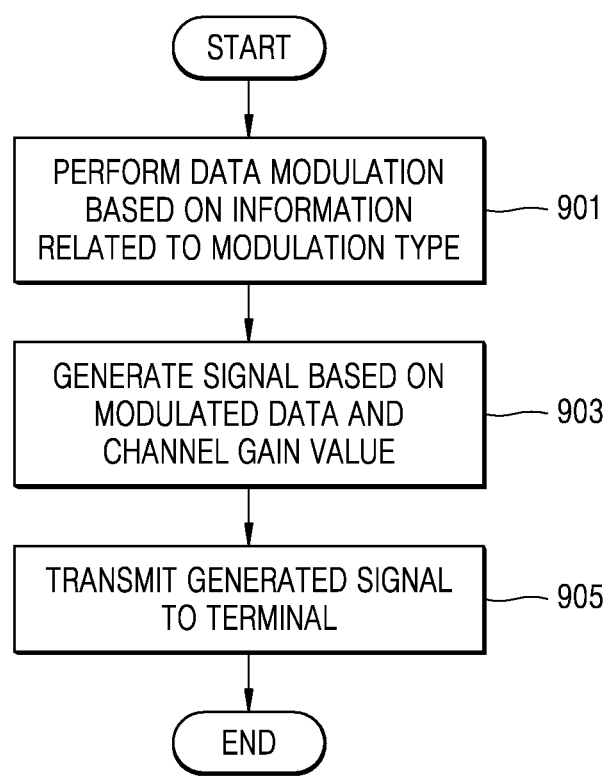
FIG. 9 is a flowchart of operations of generating a signal transmitted to a terminal, according to an embodiment of the disclosure.

FIG. 9 is a flowchart of operations of generating a signal transmitted to the terminal 140, according to an embodiment of the disclosure. The operations in FIG. 9 may be performed by the second control unit 320, but are not limited thereto. In other words, according to an embodiment of the disclosure, the fifth control unit 430 may operate in the same manner as the operating method of the second control unit 320 of FIG. 9.

Referring to FIG. 9, in operation 901, the second control unit 320 may perform data modulation based on information related to a modulation type. For example, the second control unit 320 may identify the information related to the modulation type from bit unit information received from the first control unit 310. The second control unit 320 may perform the data modulation based on the identified information related to the modulation type. According to an embodiment of the disclosure, the modulation type may be referred to as QAM mapping.

According to an embodiment of the disclosure, the second control unit 320 may modulate data based on the identified modulation type. For example, the identified modulation type may include QPSK, 16QAM, 64QAM, 256QAM, or 1024QAM. The second control unit 320 may modulate the data according to the modulation type described above. According to an embodiment of the disclosure, the data modulation may indicate that data in bit units is arranged on a grid of equal vertical and horizontal intervals on a complex plane, according to a corresponding modulation type.

In operation 903, the second control unit 320 may generate a signal based on the modulated data and a channel gain value. For example, the second control unit 320 may apply the channel gain value identified via the operations described with reference to FIG. 8 to the modulated data. For example, the second control unit 320 may generate the signal transmitted to the terminal 140 by applying (for example, multiplying) the channel gain value to the modulated bit data.

In operation 905, the second control unit 320 may transmit the generated signal to the terminal 140. For example, the second control unit 320 may generate the modulated bit data to which the channel gain value is applied via operation 903. The second control unit 320 may transmit the generated signal to the terminal 140 by additionally performing precoding, IFFT, CP addition, D/A conversion, and beamforming on the modulated bit data to which the channel gain value is applied.

As described with reference to FIGS. 6 through 9, the first control unit 310 may transmit the bit unit information and additional information to the second control unit 320. Also, the second control unit 320 may perform the data modulation and generate the signal, based on the received information. Accordingly, implementation complexity of the second control unit 320 may be decreased, and because information transmitted from the first control unit 310 to the second control unit 320 is transmitted in bit units, a transmission bandwidth of an interface between the first control unit 310 and the second control unit 320 may be reduced. Hereinafter, a function split method according to an embodiment of the disclosure will be described in more detail with reference to FIGS. 10 through 12.

Figure 10:
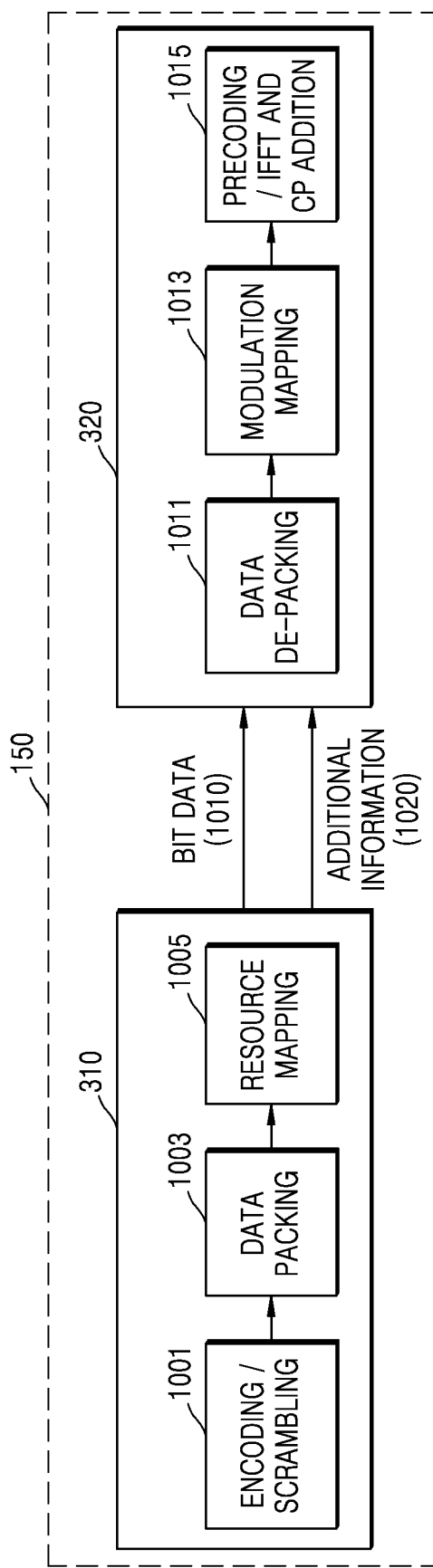
FIG. 10 is a block diagram for describing an operating method of control units in a function split structure, according to an embodiment of the disclosure.

A function split option proposed in the disclosure may denote that data is transmitted to the second control unit 320 in bit units without the first control unit 310 having to perform modulation (for example, QPSK, 16QAM, 64QAM, 256QAM, and 1024QAM) like function split option 7-3. However, unlike function split option 7-3, in the function split option according to the disclosure, data may be transmitted after the first control unit 310 performs resource mapping so as not to increase the implementation complexity of the second control unit 320. Here, the transmitting of the data after the first control unit 310 performs the resource mapping may be a similar feature as function split option 7-2a. The second control unit 320 may modulate data based on received bit unit data and apply a channel gain value to the modulated data, based on additional information received from the first control unit 310. FIG. 10 illustrates an operating method of control units in a function split structure, according to the disclosure.

FIG. 10 is a block diagram for describing an operating method of control units in a function split structure, according to an embodiment of the disclosure.

Referring to FIG. 10, the first control unit 310 and the second control unit 320 may be included in the base station 150. However, an embodiment of the disclosure is not limited thereto. According to an embodiment of the disclosure, the first control unit 310 may perform encoding and scrambling in operation 1001 on data to be transmitted to the terminal 140. For example, the first control unit 310 may perform channel coding on a transport block including the data to be transmitted and perform bitwise scrambling on code bits.

According to an embodiment of the disclosure, the first control unit 310 may perform data packing based on encoded and scrambled bits, in operation 1003. According to an embodiment of the disclosure, the data packing may indicate that bits indicating specific information are compressed in bit units. For example, the first control unit 310 may perform bitwise data packing on information related data transmitted by the base station 150 to the terminal 140, information related to a modulation type, or information related to a channel indicator for channel distinguishment. In other words, the first control unit 310 may perform data packing on a bit indicating the data transmitted by the base station 150 to the terminal 140, a bit indicating the modulation type, and a bit indicating the channel indicator. For example, the first control unit 310 may perform data packing on 2 bits indicating the data transmitted to the terminal 140, 2 bits indicating the modulation type, and 6 bits indicating the channel indicator to total 10 bits.

The first control unit 310 may map the bits on which the data packing is performed to a resource region, in operation 1005. For example, the first control unit 310 may map bits on which the data packing is performed respectively to REs in a transmission resource region. Then, the first control unit 310 may transmit bit data 1010 mapped to the resource region to the second control unit 320. Also, the first control unit 310 may transmit additional information 1020 to the second control unit 320.

According to an embodiment of the disclosure, the additional information 1020 may be included in a C-plane of the second control unit 320 and transmitted from the first control unit 310 to the second control unit 320. For example, the additional information 1020 may be transmitted to the second control unit 320 by being included in a specific message on a C-plane (for example, C-plane message). According to an embodiment of the disclosure, the additional information 1020 may be transmitted to the second control unit 320 by being included in a header of a message on a U-plane (for example, U-plane message) of the first control unit 310 and the second control unit 320. According to an embodiment of the disclosure, the additional information 1020 may include a gain value information per channel and symbol location information of a slot per RB.

According to an embodiment of the disclosure, the second control unit 320 may perform data de-packing on the bit data 1010 received from the first control unit 310, in operation 1011. According to an embodiment of the disclosure, the data de-packing may indicate that the bit data 1010 on which the data packing is performed in bit units is decompressed and identified. For example, the second control unit 320 may perform the data de-packing on the bit data 1010 to identify the information related to the data transmitted by the base station 150 to the terminal 140, the information related to the modulation type, and the information related to the channel indicator for channel distinguishment. For example, the second control unit 320 may perform the data de-packing on the bit data 1010 to identify the bit indicating the data transmitted by the base station 150 to the terminal 140, the bit indicating the modulation type, or the bit indicating the channel indicator. For example, the second control unit 320 may receive the bit data 1010 of 10 bits, and identify, from the received bit data 1010 of 10 bits, the 2 bits indicating the data transmitted to the terminal 140, the 2 bits indicating the modulation type, and the 6 bits indicating the channel indicator.

According to an embodiment of the disclosure, the second control unit 320 may perform modulation mapping based on the bits identified via the data de-packing and the additional information 1020, in operation 1013. According to an embodiment of the disclosure, the modulation mapping may indicate modulating of the data transmitted by the base station 150 to the terminal 140 and generating of a signal transmitted to the terminal 140 by applying a channel gain value to the modulated data.

According to an embodiment of the disclosure, the second control unit 320 may modulate the data transmitted by the base station 150 to the terminal 140. For example, the second control unit 320 may identify the modulation type of the data, based on the bit indicating the modulation type among the bits identified via the data de-packing. The second control unit 320 may modulate the bit indicating the data transmitted by the base station 150 to the terminal 140, based on the identified modulation type.

The second control unit 320 may identify a channel where the data is transmitted, based on the bit indicating the channel indicator among the bits identified via the data de-packing. For example, the channel where the data is transmitted may include a channel for PSS, a channel for SSS, a channel for PBCH, a channel for PDCCH, or a channel for PDSCH. According to an embodiment of the disclosure, the second control unit 320 may identify a channel gain value corresponding to the identified channel.

According to an embodiment of the disclosure, the second control unit 320 may apply the channel gain value to the modulated data. For example, the second control unit 320 may perform multiplication on the modulated data and the channel gain value of the channel where the data is transmitted.

According to an embodiment of the disclosure, the second control unit 320 may perform precoding, IFFT, and CP addition on the data on which the modulation mapping is performed, in operation 1015. The second control unit 320 may generate a signal to be transmitted to the terminal 140 by performing D/A conversion and beamforming on the signal on which the CP addition is performed. Also, the second control unit 320 may transmit the generated signal to the terminal 140.

According to an embodiment of the disclosure, in FIG. 10, the first control unit 310 may be replaced by the fourth control unit 420 and the second control unit 320 may be replaced by the fifth control unit 430. In other words, the fourth control unit 420 may perform the same operations as the first control unit 310 of FIG. 10, and the fifth control unit 430 may perform the same operations as the second control unit 320 of FIG. 10.

For example, as shown in FIG. 10, the fourth control unit 420 may perform encoding and scrambling on bits, perform data packing on the bits on which the encoding and scrambling are performed, and map the bits on which the data packing is performed to a resource region. Then, the fourth control unit 420 may transmit mapped bit data to the fifth control unit 430. The fifth control unit 430 may perform data de-packing on the bit data received from the fourth control unit 420 and perform modulation mapping based on the bits identified via the data de-packing and additional information. Also, the fifth control unit 430 may perform precoding, IFFT, and CP addition on the data on which the modulation mapping is performed.

Hereinafter, examples related to the data packing performed in operation 1003 will be described. According to an embodiment of the disclosure, the bit data 1010 may include the information related to the data transmitted by the base station 150 to the terminal 140. According to an embodiment of the disclosure, the information related to the data transmitted by the base station 150 to the terminal 140 may indicate the bit indicating the data transmitted by the base station 150 to the terminal 140.

For example, when the modulation type of the data transmittable by the first control unit 310 highest is 256QAM, at least 8 bits may be required for the base station 150 to transmit the data to the terminal 140. Here, the bit indicating the data transmitted by the base station 150 to the terminal 140 may be 8 bits.

Also, according to an embodiment of the disclosure, the bit data 1010 may include, in addition to the information related to the data transmitted by the base station 150 to the terminal 140, the information indicating the modulation type of the transmitted data. For example, the information indicating the modulation type may be represented a 0 when the modulation type is QPSK, 1 when the modulation type is 16QAM, 2 when the modulation type is 64QAM, 3 when the modulation type is 256QAM, and 4 when the modulation type is 1024QAM. According to an embodiment of the disclosure, the information indicating the modulation type of the transmitted data may indicate the bit indicating the modulation type.

Also, according to an embodiment of the disclosure, the bit data 1010 may include the information related to the channel indicator for channel distinguishment. For example, the information related to the channel indicator for channel distinguishment may indicate the bit indicating the channel indicator for distinguishing a channel of the transmitted data. According to an embodiment of the disclosure, Table 1 below shows an example of a signal on which data packing is performed in 10 bits.

TABLE 1

| QAM | | Bit index | | | | | | | | | | |
|---|---|---|---|---|---|---|---|---|---|---|---|---|
| Index | Signal | 9 | 8 | 7 | 6 | 5 | 4 | 3 | 2 | 1 | 0 |
| 0 | PDSCH QPSK/Others | 0 | 0 | b5 | b4 | b3 | b2 | b1 | b0 | c1 | c0 |
| 1 | PDSCH 16QAM | 0 | 1 | 0 | 0 | 0 | 0 | c3 | c2 | c1 | c0 |
| 2 | PDSCH 64QAM | 1 | 0 | 0 | 0 | c5 | c4 | c3 | c2 | c1 | c0 |
| 3 | PDSCH 256QAM | 1 | 1 | c7 | c6 | c5 | c4 | c3 | c2 | c1 | c0 |

In Table 1, QAM Index indicates an index for distinguishing a signal according to each modulation type, Signal indicates a type of a signal transmitted by the base station 150 to the terminal 140 and a modulation type corresponding to the type of the signal, and Bit Index indicates an index of each bit (for example, 0 through 9) when bitwise data packing is performed on each signal.

In Table 1, the signal transmitted by the base station 150 to the terminal 140 may be PDSCH, but is not limited thereto. According to an embodiment of the disclosure, when values of a QAM index are 0, 1, 2, and 3, modulation types of a PDSCH signal may be QPSK, 16QAM, 64QAM, and 256QAM. Here, bits of 9th and 8th bit indexes may indicate the modulation type of the PDSCH signal. For example, the bits of 9th and 8th bit indexes may be 00 when QPSK, 01 when 16QAM, 10 when 64QAM, and 11 when 256QAM.

According to an embodiment of the disclosure, the data transmitted by the base station 150 to the terminal 140 may be represented in 2 bits when QPSK, 4 bits when 16QAM, 6 bits when 64QAM, and 8 bits when 256QAM. For example, when the modulation type is QPSK, c0 and c1 bits corresponding to 0th and 1st bit indexes may be the bit indicating the data transmitted by the base station 150 to the terminal 140. Also, when the modulation type is 16QAM, c0 through c3 bits corresponding to 0th through 3rd bit indexes may be the bit indicating the data transmitted by the base station 150 to the terminal 140. Also, when the modulation type is 64QAM, c0 through c5 bits corresponding to 0th through 5th bit indexes may be the bit indicating the data transmitted by the base station 150 to the terminal 140. Also, when the modulation type is 256QAM, c0 through c7 bits corresponding to 0th through 7th bit indexes may be the bit indicating the data transmitted by the base station 150 to the terminal 140.

However, in QPSK, in addition to the bit indicating the data transmitted by the base station 150 to the terminal 140 and the bit indicating the modulation type, the bit indicating the channel indicator may be further included in the signal on which the data packing is performed. For example, in Table 1, the signal of the modulation type of QPSK may include b0 through b5 bits indicating the channel indicator. Details about the bit indicating the channel indicator will be described in detail below.

In an embodiment of the disclosure, modulation of 1024QAM may be used for data transmission. For example, Table 2 below shows an example of a signal on which data packing is performed in 13 bits.

TABLE 2

| QAM | | Bit Index | | | | | | | | | | | | |
|---|---|---|---|---|---|---|---|---|---|---|---|---|---|---|
| Index | Signal | 12 | 11 | 10 | 9 | 8 | 7 | 6 | 5 | 4 | 3 | 2 | 1 | 0 |
| 0 | PDSCH QPSK/Others | 0 | 0 | 0 | b7 | b6 | b5 | b4 | b3 | b2 | b1 | b0 | c1 | c0 |
| 1 | PDSCH 16QAM | 0 | 0 | 1 | 0 | 0 | 0 | 0 | 0 | 0 | c3 | c2 | c1 | c0 |
| 2 | PDSCH 64QAM | 0 | 1 | 0 | 0 | 0 | 0 | 0 | c5 | c4 | c3 | c2 | c1 | c0 |
| 3 | PDSCH 256QAM | 0 | 1 | 1 | 0 | 0 | c7 | c6 | c5 | c4 | c3 | c2 | c1 | c0 |
| 4 | PDSCH 1024QAM | 1 | 0 | 0 | c9 | c8 | c7 | c6 | c5 | c4 | c3 | c2 | c1 | c0 |

In Table 2, QAM Index indicates an index for distinguishing a signal according to each modulation type, Signal indicates a type of a signal transmitted by the base station 150 to the terminal 140 and a modulation type corresponding to the type of the signal, and Bit Index indicates an index of each bit (for example, 0 through 12) when bitwise data packing is performed on each signal.

In Table 2, the signal transmitted by the base station 150 to the terminal 140 may be PDSCH, but is not limited thereto. According to an embodiment of the disclosure, when values of a QAM index are 0, 1, 2, 3, and 4, modulation types of a PDSCH signal may be QPSK, 16QAM, 64QAM, 256QAM, and 1024QAM. Here, bits of 12th, 11th, and 10th bit indexes may indicate the modulation type of the PDSCH signal. For example, the bits of 12th, 11th, and 10th bit indexes may be 000 when QPSK, 001 when 16QAM, 010 when 64QAM, 011 when 256QAM, and 100 when 1024QAM.

According to an embodiment of the disclosure, the data transmitted by the base station 150 to the terminal 140 may be represented in 2 bits when QPSK, 4 bits when 16QAM, 6 bits when 64QAM, 8 bits when 256QAM, and 10 bits when 1024QAM. For example, when the modulation type is QPSK, c0 and c1 bits corresponding to 0th and 1st bit indexes may be the bit indicating the data transmitted by the base station 150 to the terminal 140. Also, when the modulation type is 16QAM, c0 through c3 bits corresponding to 0th through 3rd bit indexes may be the bit indicating the data transmitted by the base station 150 to the terminal 140. Also, when the modulation type is 64QAM, c0 through c5 bits corresponding to 0th through 5th bit indexes may be the bit indicating the data transmitted by the base station 150 to the terminal 140. Also, when the modulation type is 256QAM, c0 through c7 bits corresponding to 0th through 7th bit indexes may be the bit indicating the data transmitted by the base station 150 to the terminal 140. Also, when the modulation type is 1024QAM, c0 through c9 bits corresponding to 0th through 9th bit indexes may be the bit indicating the data transmitted by the base station 150 to the terminal 140.

However, in QPSK, in addition to the bit indicating the data transmitted by the base station 150 to the terminal 140 and the bit indicating the modulation type, the bit indicating the channel indicator may be further included in the signal on which the data packing is performed. For example, in Table 2, the signal of the modulation type of QPSK may include b0 through b7 bits indicating the channel indicator. Details about the bit indicating the channel indicator will be described in detail below.

As described in Table 1 and Table 2, the data packing may be performed on the data to be transmitted by the first control unit 310 in 10 or 13 bits based on the modulation type. The first control unit 310 may map the signal on which the data packing is performed to the resource region for each RE. The first control unit 310 may transmit bit data 1010 mapped for each RE to the second control unit 320. The second control unit 320 may perform the data de-packing on the received bit data 1010. Through the data de-packing the second control unit 320 may identify the bit indicating the modulation type. For example, in Table 1, the second control unit 320 may identify the bits of 9th and 8th bit indexes as the bit indicating the modulation type. In Table 2, the second control unit 320 may identify the bits of 12th, 11th, and 10th bit indexes as the bit indicating the modulation type.

In LTE or NR on the 3GPP standard, because the modulation types 16QAM through 1024QAM are used only for PDSCH, the second control unit 320 may perform the modulation mapping by using channel gain information corresponding to PDSCH when the second control unit 320 identifies the bit indicating the modulation type (for example, the bits of 9th and 8th bit indexes in Table 1 or the bits of 12th, 11th, and 10th bit indexes in Table 2) via the data de-packing. Here, the channel gain information corresponding to PDSCH may be pre-determined and stored in the second control unit 320 or may be included in the additional information 1020 transmitted by the first control unit 310 to the second control unit 320, but is not limited thereto.

However, when the modulation type is QPSK, QPSK may be used for, in addition to PDSCH, demodulation reference signal (DMRS), channel state information reference signal (CSI-RS), tracking reference signal (TRS), phase tracking reference signal (PTRS), PDCCH, PBCH, PSS, and SSS, and thus each channel may need to be distinguished. Accordingly, in an embodiment of the disclosure, the bit indicating the channel indicator for distinguishing the above channels may be included in the bit data 1010.

According to an embodiment of the disclosure, when the bit indicating the channel indicator is included in the bit data 1010, information indicating how the second control unit 320 is to read the bit data 1010 may be included in the additional information 1020. Here, the information indicating how to read the bit data 1010 may not be only included in the additional information 1020, but may be pre-stored in the second control unit 320 or may be included in the bit data 1010.

The information indicating how to read the bit data 1010 may include information about which bit includes the data transmitted by the base station 150 to the terminal 140. For example, in Table 2, the information indicating whether the information related to the data transmitted by the base station 150 to the terminal 140 is included in the c1 and c0 bits or in the c9 and c8 bits may be included in the additional information 1020.

Also, the information indicating how to read the bit data 1010 may include information about which table is to be used to interpret the channel indicator among a plurality of tables indicating channel indicators. For example, in Table 2, when the bit indicating the channel indicator is b0, b4, b3, b2, b1, and b0 bits, there may be a plurality of tables indicating to which channels the b5, b4, b3, b2, b1, and b0 bits correspond. Here, the additional information 1020 may include information about which table among the plurality of tables is to be used to interpret the bit indicating the channel indicator.

According to an embodiment of the disclosure, the bit indicating the channel indicator may be configured among bits excluding the bit indicating the modulation type from the bit data 1010.

For example, in the example of Table 1, the bits of 9th and 8th bit indexes indicating the modulation type may be excluded from the 10 bits. Then, the bit indicating the channel indicator may be configured among the bits of the 0th through 7th bit indexes.

For example, in a 0th PDSCH signal modulated in QPSK, from a signal on which data packing is performed in 10 bits, c0 and c1 bits of 0th and 1st bit indexes may be configured as the bit indicating the transmitted data, and b0 through b5 bits of 2nd through 7th bit indexes may be configured as the bit indicating the channel indicator. In other words, in the example of Table 1, 6 bits may be used for channel distinguishment.

For example, in the example of Table 2, the bits of 12th, 11th, and 10th bit indexes indicating the modulation type may be excluded from the 13 bits. Then, the bit indicating the channel indicator may be configured among the bits of the 0th through 9th bit indexes.

For example, in a 0th PDSCH signal modulated in QPSK, from a signal on which data packing is performed in 13 bits, c0 and c1 bits of 0th and 1st bit indexes may be configured as the bit indicating the transmitted data, and b0 through b7 bits of 2nd through 9th bit indexes may be configured as the bit indicating the channel indicator. In other words, in the example of Table 2, 8 bits may be used for channel distinguishment.

According to an embodiment of the disclosure, when the bit indicating the channel indicator is configured in 6 bits as in Table 1, a channel may be indicated as in Table 3 below.

TABLE 3

| Signal | | Signal clarification for QPSK (b5~b0) | | | | | |
|---|---|---|---|---|---|---|---|
| Index | Signal | 5 | 4 | 3 | 2 | 1 | 0 |
| 1 | PSS | 0 | 0 | 0 | 0 | 0 | 1 |
| 2 | SSS | 0 | 0 | 0 | 0 | 1 | 0 |
| 3 | PBCH | 0 | 0 | 0 | 0 | 1 | 1 |
| 4 | PDCCH | 0 | 0 | 0 | 1 | 0 | 0 |
| ... | ... | x | x | x | x | x | x |

In Table 3, Signal index indicates indexes of distinguishable channels, and Signal indicates the distinguishable channels. Each channel may be distinguished in 6 bits (for example, b0 through b5 bits). For example, PSS may correspond to 000001 bits, SSS may correspond to 000010 bits, PBCH may correspond to 000011 bits, and PDCCH may correspond to 000100 bits. In other words, each channel where a signal is transmitted may be distinguished via the bit indicating the channel indicator.

According to another embodiment of the disclosure, in the example of Table 1, when a 16QAM modulation method is used, bits of 4th through 7th bit indexes have a value of 0, but are not limited thereto, and various information, such as information related to a channel, may be included in the bits of the 4th through 7th bit indexes. Also, when a 64QAM modulation method is used, bits of 6th and 7th bit indexes have a value of 0, but are not limited thereto, and various information, such as information related to a channel, may be included in the bits of the 6th and 7th bit indexes.

According to another embodiment of the disclosure, in the example of Table 2, when a 16QAM modulation method is used, bits of 4th through 9th bit indexes have a value of 0, but are not limited thereto, and various information, such as information related to a channel, may be included in the bits of the 4th through 9th bit indexes. Also, when a 64QAM modulation method is used, bits of 6th through 9th bit indexes have a value of 0, but are not limited thereto, and various information, such as information related to a channel, may be included in the bits of the 6th through 9th bit indexes. Also, when a 256QAM modulation method is used, bits of 8th and 9th bit indexes have a value of 0, but are not limited thereto, and various information, such as information related to a channel, may be included in the bits of the 8th and 9th bit indexes.

Figure 11:
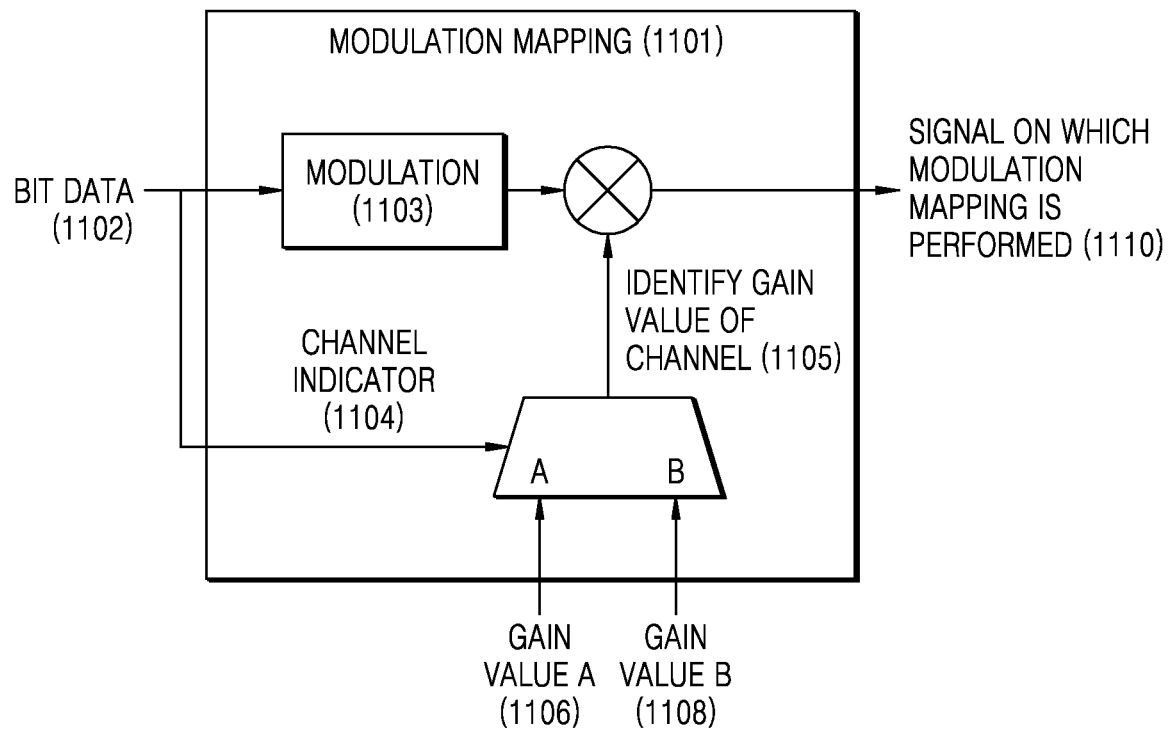
FIG. 11 is a block diagram for describing a modulation mapping performing method of a second control unit, according to an embodiment of the disclosure.

FIG. 11 is a block diagram for describing a modulation mapping performing method of the second control unit 320, according to an embodiment of the disclosure. According to an embodiment of the disclosure, the fifth control unit 430 may perform modulation mapping in the same manner as the modulation mapping performing method of the second control unit 320 of FIG. 11.

Referring to FIG. 11, the second control unit 320 may receive bit data 1102 and perform modulation mapping in operation 1101. According to an embodiment of the disclosure, the bit data 1102 may denote information represented in bit units. The bit data 1102 may include a bit indicating data transmitted by the base station 150 to the terminal 140, a bit indicating a modulation type, and a bit indicating a channel indicator 1104. According to an embodiment of the disclosure, among the bit data 1102, the bit indicating the data transmitted by the base station 150 to the terminal 140 and the bit indicating the modulation type may be used for modulation 1103, and the bit indicating the channel indicator 1104 may be used to identify a gain of each channel. According to an embodiment of the disclosure, the modulation 1103 may denote QAM mapping.

According to an embodiment of the disclosure, the second control unit 320 may perform the modulation 1103 on the bit indicating the data transmitted by the base station 150 to the terminal 140. Although not shown in FIG. 11, the second control unit 320 may receive additional information from the first control unit 310. Here, the additional information may include information indicating a channel gain value of a channel where a signal is transmitted or information indicating a location of a mini-slot in a resource region where a signal is transmitted. Here, the location of the mini-slot in the resource region where the signal is transmitted may correspond to the channel gain value of the channel where the signal is transmitted.

According to an embodiment of the disclosure, the second control unit 320 may identify a gain value for each channel, based on additional information. For example, the second control unit 320 may identify a gain value A 1106 for a channel. A and a gain value B 1108 for a channel B.

According to an embodiment of the disclosure, the second control unit 320 may identify a channel corresponding to a signal transmitted to the terminal 140, by using the bit indicating the channel indicator 1104. Also, the second control unit 320 may identify a channel gain value corresponding to the identified channel among at least one channel gain value, in operation 1105. For example, when the bit indicating the channel indicator 1104 indicates the channel A, the second control unit 320 may identify the gain value A 1106 for the channel. A as the channel gain value among the at least one channel gain value. Referring to FIG. 11, the channels. A and B and the gain values A and B 1106 and 1108 are described, but an embodiment of the disclosure is not limited thereto.

The second control unit 320 may apply the identified channel gain value to modulated data to generate a signal 1110 on which modulation mapping is performed. For example, the second control unit 320 may input the modulated data and the identified channel gain value to a signal multiplier. Then, the second control unit 320 may output a data value to which the channel gain value is applied from the signal multiplier. According to an embodiment of the disclosure, the signal 1110 on which modulation mapping is performed may denote a bit data value to which the channel gain value is applied.

When a function split option proposed in the disclosure is used, features of option 7-3 and option 7-2a may be both used. For example, when the existing function split option 7-2a is used and data is transmitted in a framework where subcarrier spacing is 30 kHz and a system bandwidth is 100 MHz, I/Q data may be transmitted in each 16 bits, 8 layers, 273 RBs, and 14 symbols for each 0.5 ms. Here, a bandwidth for data transmission may be calculated to be 23.5 Gbps via 2(I/Q)×16(bits)×8(layer)×273(RB)×12(RE)×14(symbol/0.5 ms)=23.5 Gbps.

However, when the function split option proposed in the disclosure is used, the bandwidth for data transmission may be calculated to be 7.4 Gbps+α via 10(bits)×8(layer)×273 (RB)×12(RE)×14(symbol/0.5 ms)+α=7.4 Gbps+α. Accordingly, when the function split option according to the disclosure is used, a required smallest bandwidth is 7.4 Gbps. Thus, compared with the bandwidth 23.5 Gpbs according to the option 7-2a, the bandwidth of the function split option according to the disclosure may be reduced by about 3 times. In other words, compared with the bandwidth required for option 7-2a, the bandwidth required for the function split option according to the disclosure may be reduced by about 68%. A value of α may denote a bandwidth required to transmit additional information required for operations of the second control unit 320. Hereinbelow, how the value of α indicating the bandwidth for transmitting the additional information is determined according to various embodiments of the disclosure will be described.

According to an embodiment of the disclosure, when a gain for each UE or channel is adjusted in y dB step from −X dB to +X dB, the number of bits according to the adjusted gain may be determined according to Equation 1 below.

$$\mathrm{bit}_{width} = \mathrm{cell\ ing}(\log_2(2X/y))$$ Equation 1

In Equation 1, X denotes an absolute value of an upper limit or lower limit when the gain for each channel is adjusted, y denotes a value indicating a step where the gain for each channel is adjusted, and $\mathrm{bit}_{width}$ denotes the number of bits required to transmit a gain value for each channel when the gain for each channel is adjusted. For example, when the gain for each channel is adjusted in 0.125 dB step from −15 dB to +15 dB, X is 15 and y is 0.125, and thus $\mathrm{bit}_{width}$ may be 8 bits.

According to an embodiment of the disclosure, when a difference value between a gain value of a current channel and a gain value of a previous channel of the current channel is transmitted, the number of bits required to transmit a gain value for each channel may be reduced. For example, when the gain value of the current channel is −14.5 dB, and the gain value of the previous channel is −15 dB, the difference value is 0.5 dB. Here, instead of transmitting a bit value indicating −14.5 dB, a bit value indicating 0.5 dB may be transmitted to reduce the number of bits required to transmit the gain value for each channel.

According to an embodiment of the disclosure, the number of gain values required for each UE or for each channel may correspond to the number of required channels or signals. For example, in NR of Rel. 15, a signal or channel used for DL may be configured of PSS, SSS, PBCH, PDCCH, PDSCH, DMRS, CSI-RS, TRS, or PTRS. Here, the gain value required for each UE or for each channel may be 9 representative channel gain values described above. Table 4 below shows an example of a bandwidth required to transmit a channel gain value for 9 representative channels.

TABLE 4

| | Channel | Gain bit-width | # Layers | RB | Total bit-width | Bandwidth (Mbps) |
|---|---|---|---|---|---|---|
| 1 | PSS | 8 | 1 | 1 | 8 | 0.016 |
| 2 | SSS | 8 | 1 | 1 | 8 | 0.016 |
| 3 | PBCH | 8 | 1 | 1 | 8 | 0.016 |
| 4 | PDCCH | 8 | 1 | 1 | 8 | 0.016 |
| 5 | PDSCH | 8 | 8 | 273 | 17472 | 34.944 |
| 6 | DMRS | 8 | 1 | 1 | 8 | 0.016 |
| 7 | CSI-RS | 8 | 1 | 1 | 8 | 0.016 |
| 8 | TRS | 8 | 1 | 1 | 8 | 0.016 |
| 9 | PRS | 8 | 1 | 1 | 8 | 0.016 |
| | Total | | | | | 35.072 |

In Table 4, Channel denotes a signal or channel transmitted to the terminal 140, Gain bit-width denotes the number of bits required to transmit a gain value for each channel, # Layers denotes the number of layers, RB denotes a resource block, Total bit-width denotes the number of bits for transmitting a corresponding gain value, and Bandwidth denotes a bandwidth required to transmit a corresponding gain value. In Table 4, a bandwidth is represented in Mbps units, but is not limited thereto.

According to an embodiment of the disclosure, in a PDSCH, up to L PDSCHs may be multiplexed in the same RB, and thus L gains represented in 8 bits may be required for each RB. Here, when a framework in which subcarrier spacing is 30 kHz and system bandwidth is 100 MHz is assumed, transmission of 8 layers is required and information of 8 (bits)×8 (layer)×273 (RB) may need to be transmitted within 0.5 ms. Accordingly, a bandwidth of about 35 Mbps may be required to indicate a gain value of PDSCH. As shown in Table 4, a bandwidth of 35.1 Mbps in overall may be required to transmit the gain value of 9 representative channels. In other words, the bandwidth a for the first control unit 310 to transmit the additional information to the second control unit 320 may be 35.1 Mbps.

Hereinafter, an example of assigning a channel gain value for each mini-slot when the mini-slot is configured will be described with reference to FIG. 12.

Figure 12:
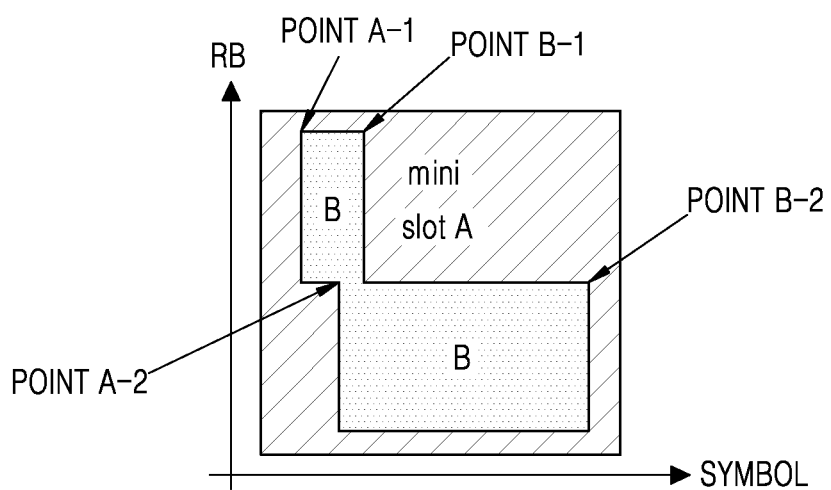
FIG. 12 illustrates an example related to location identification of a mini-slot symbol, according to an embodiment of the disclosure.

FIG. 12 illustrates an example related to location identification of a mini-slot symbol, according to an embodiment of the disclosure.

Referring to FIG. 12, in the NR standard, one or more mini-slots may be configured in one slot. A mini-slot may be configured for one or more symbols in one slot. For example, in FIG. 12, a mini-slot A and a mini-slot B may be included in one slot. Here, the mini-slot B may have different numbers of symbols for each RB.

According to an embodiment of the disclosure, additional information transmitted from the first control unit 310 to the second control unit 320 may include information for identifying a location of a mini-slot. For example, the information for identifying the location of the mini-slot may include bit information indicating points where the mini-slot B starts and ends for each RB. For example, the point where the mini-slot B starts may be configured as a point A-1 and the point where the mini-slot B ends may be configured as a point B-1 for the same RB. As for another example, the point where the mini-slot B starts may be configured as a point A-2 and the point where the mini-slot B ends may be configured as a point B-2 for the same RB.

As described above, 4 bits may be used to indicate the point where the mini-slot B starts for each RB. In other words, 4 bits may be used to indicate the point A-1 or the point A-2. Also, 4 bits may be used to indicate the point where the mini-slot B ends for each RB. In other words, 4 bits may be used to indicate the point B-1 or the point B-2. Thus, 8 bits may be required for each RB to indicate the points where the mini-slot B starts and ends for each RB. However, this is only an example and an embodiment of the disclosure is not limited thereto. Table 5 below shows an example of a bandwidth for transmitting a gain value for a representative channel used for DL and a location of a symbol in NR of Rel. 15.

TABLE 5

| | Channel | Gain bit-width | # Layers | RB | Total bit-width | Bandwidth (Mbps) |
|---|---|---|---|---|---|---|
| 1 | PSS | 8 | 1 | 1 | 8 | 0.016 |
| 2 | SSS | 8 | 1 | 1 | 8 | 0.016 |
| 3 | PBCH | 8 | 1 | 1 | 8 | 0.016 |
| 4 | PDCCH | 8 | 1 | 1 | 8 | 0.016 |
| 5 | PDSCH A | 8 | 8 | 273 | 17472 | 34.944 |
| 6 | PDSCH B | 8 | 8 | 273 | 17472 | 34.944 |
| 7 | DMRS | 8 | 1 | 1 | 8 | 0.016 |
| 8 | CSI-RS | 8 | 1 | 1 | 8 | 0.016 |
| 9 | TRS | 8 | 1 | 1 | 8 | 0.016 |
| 10 | PRS | 8 | 1 | 1 | 8 | 0.016 |
| 11 | Symbol Position | 8 | 1 | 273 | 2184 | 4.368 |
| | Total | | | | | 74.384 |

In Table 5, Channel denotes a signal or channel transmitted to the terminal 140, Gain bit-width denotes the number of bits required to transmit a gain value for each channel, # Layers denotes the number of layers, RB denotes a resource block, Total bit-width denotes the number of bits for transmitting a corresponding gain value, and Bandwidth denotes a bandwidth required to transmit a corresponding gain value or symbol location.

According to an embodiment of the disclosure, when a framework in which subcarrier spacing is 30 kHz and system bandwidth is 100 MHz is assumed, a bandwidth of 273(RB)×8 bits/0.5 ms=4.4 Mbps may be required to transmit additional information of 8 bits for each RB. In other words, in Table 5, a bandwidth of 4.4 Mbps may be required to transmit information about a symbol location of a mini-slot.

According to an embodiment of the disclosure, because different UEs may be present for a mini-slot A group and a mini-slot B group, as shown in Table 5, two types of gain values, i.e., a gain value for PDSCH group A and a gain value for PDSCH group B, may be required for gain values required for PDSCH. Here, 35 Mbps may be required to indicate the gain value for the PDSCH group A and 35 Mbps may be required to indicate the gain value for the PDSCH group B of Table 5. Thus, a bandwidth of about 70 Mbps may be required to indicate a gain of PDSCH.

In the example of Table 5, the bandwidth α for the first control unit 310 to transmit the additional information to the second control unit 320 may be 74.384 Mbps. Accordingly, when the function split option proposed in the disclosure is applied, a bandwidth (for example, 7.4 Gbps) required to transmit bitwise data is a very high value compared to α, and thus the sum of the bandwidth (for example, 7.4 Gbps) required to transmit the bitwise data according to the disclosure and the bandwidth (α=74.38 Mbps) required to transmit the additional information may be significantly small compared to a bandwidth (for example, 23.5 Gbps) required to transmit data for the existing option 7-2a. In other words, even when the additional information is considered, according to the function split structure according to the disclosure, a transmission bandwidth of an interface between the first control unit 310 and the second control unit 320 may be reduced compared to a transmission bandwidth in an existing function split structure.

Information about channels (for example, a channel gain) of Table 5 may be included in a C-plane message and transmitted from the fourth control unit 420 (for example, O-DU) to the fifth control unit 430 (for example, O-RU). According to an embodiment of the disclosure, the information about channels may be assigned as an extension flag. For example, when the information about channels is required, information assigned as the extension flag may be transmitted via the C-plane message.

According to an embodiment of the disclosure, in the function split option of the disclosure, a normal slot and a mini-slot may be both used without having to separately distinguish an extended C-plane message. For example, as shown in Table 6, the increase in fronthaul transmission bandwidth may be reduced while the normal slot and the mini-slot are both used by distinguishing information included in additional information when the normal slot is used and information included in additional information when the mini-slot is used.

TABLE 6

| | Channel | Gain bit-width | # Layers | RB | Total bit-width | Bandwidth (Mbps) |
|---|---|---|---|---|---|---|
| 1 | PSS | 8 | 1 | 1 | 8 | 0.016 |
| 2 | SSS | 8 | 1 | 1 | 8 | 0.016 |
| 3 | PBCH | 8 | 1 | 1 | 8 | 0.016 |
| 4 | PDCCH | 8 | 1 | 1 | 8 | 0.016 |
| 5 | PDSCH A | 8 | 8 | 273 | 17472 | 34.944 |
| 6 | DMRS | 8 | 1 | 1 | 8 | 0.016 |
| 7 | CSI-RS | 8 | 1 | 1 | 8 | 0.016 |
| 8 | TRS | 8 | 1 | 1 | 8 | 0.016 |
| 9 | PRS | 8 | 1 | 1 | 8 | 0.016 |
| 10 | PDSCH B | 8 | 8 | 273 | 17472 | 34.944 |
| 11 | Symbol Position | 8 | 1 | 273 | 2184 | 4.368 |
| | Total | | | | | 74.384 |

In Table 6, Channel denotes a signal or channel transmitted to the terminal 140, Gain bit-width denotes the number of bits required to transmit a gain value for each channel, # Layers denotes the number of layers, RB denotes a resource block, Total bit-width denotes the number of bits for transmitting a corresponding gain value, and Bandwidth denotes a bandwidth required to transmit a corresponding gain value or symbol location.

According to an embodiment of the disclosure, the additional information may be transmitted from the fourth control unit 420 to the fifth control unit 430. Here, when the normal slot is used, information from no. 1 to no. 9 of Table 6 may be included in the additional information. On the other hand, when the mini-slot is used, information from no. 1 to no. 11 of Table 6 may be included in the additional information. Also, the additional information may include information related to using of the mini-slot is used. For example, an indicator indicating a range of the information of Table 6 included in the additional information may be included in the additional information. Here, the indicator may be referred to as a mini-slot indicator.

For example, when the normal slot is used, the indicator may indicate to use information from no. 1 to no. 9 of Table 6 and the additional information may include the information from no. 1 to no. 9 of Table 6. Also, when the mini-slot is used, the indicator may indicate to use information from no. 1 to no. 11 of Table 6 and the additional information may include the information from no. 1 to no. 11 of Table 6.

As described above, when the normal slot is used, because the information from no. 1 to no. 9 of Table 6 may be used, a fronthaul transmission bandwidth for transmitting the used information may be about 35 Mbps. Also, when the mini-slot is used, because the information from no. 1 to no. 11 of Table 6 may be used, a fronthaul transmission bandwidth for transmitting the used information may be about 74 Mbps. In other words, by distinguishing the information included in the additional information based on the using of the mini-slot, the increase in the fronthaul transmission bandwidth caused by the using of the mini-slot may be reduced.

According to an embodiment of the disclosure, the data transmitted from the first control unit 310 to the second control unit 320 may be packed in bit units. Here, when a 1024QAM modulation method is used, the number of bits used for bit packing may be reduced. For example, the bit packing may be performed as Table 7 below.

TABLE 7

| QAM Index | Signal | Bit Index | | | | | | | | | | |
|---|---|---|---|---|---|---|---|---|---|---|---|---|
| | | 10 | 9 | 8 | 7 | 6 | 5 | 4 | 3 | 2 | 1 | 0 |
| 0 | PDSCH QPSK/Others | 0 | 0 | 0 | b5 | b4 | b3 | b2 | b1 | b0 | c1 | c0 |
| 1 | PDSCH 16QAM | 0 | 0 | 1 | 0 | 0 | 0 | 0 | c3 | c2 | c1 | c0 |
| 2 | PDSCH 64QAM | 0 | 1 | 0 | 0 | 0 | c5 | c4 | c3 | c2 | c1 | c0 |
| 3 | PDSCH 256QAM | 0 | 1 | 1 | c7 | c6 | c5 | c4 | c3 | c2 | c1 | c0 |
| 4 | PDSCH 1024QAM | 1 | c9 | c8 | c7 | c6 | c5 | c4 | c3 | c2 | c1 | c0 |

In Table 7, QAM Index indicates an index for distinguishing a signal according to each modulation type, Signal indicates a type of a signal transmitted by from the first control unit 310 to the second control unit 320 and a modulation type corresponding to the type of the signal, and Bit Index indicates an index of each bit (for example, 0 through 9) when each signal is represented in bit units.

In Table 7, 1024QAM and remaining modulation types may be distinguished by 1 bit that is a most significant bit (MSB) among 11 bits. For example, a bit of 10th bit index among 11 bits may be determined as MSB. Here, when the bit of 10th bit index is 1, a corresponding bit value may indicate 1024QAM, and when the bit of 10th bit index is 0, the corresponding bit value may indicate remaining modulation types other than 1024QAM. Referring to the example of Table 7, when the modulation type is 1024QAM, the value of the bit of 10th bit index may be 1 and remaining lower 10 bits may be used as data bits. Also, when the modulation type is not 1024QAM, a modulation type (for example, QPSK, 16QAM, 64QAM, or 256QAM) may be distinguished via values of bits of 9th and 8th bit indexes. At this time, remaining 8 bits may be used as the data bits.

When the bit packing is performed by distinguishing the modulation type based on 1024QAM as shown in Table 7, the number of bits (for example, 11 bits) less than the number of bits (for example, 13 bits) required for the bit packing in the example of Table 2 above may be used.

Figure 13:
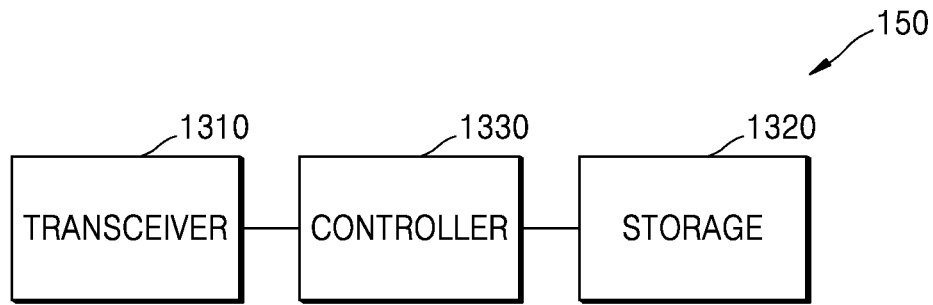
FIG. 13 is a block diagram of a configuration of a base station, according to an embodiment of the disclosure.

FIG. 13 is a block diagram of a configuration of the base station 150, according to an embodiment of the disclosure.

Referring to the FIG. 13, the base station 150 may include a transceiver 1310, a storage 1320, and a controller 1330.

The transceiver 1310 may perform functions for transmitting and receiving information. In particular, the transceiver 1310 may provide an interface for performing communication with other nodes in a network. For example, the transceiver 1310 may perform communication with the terminal 140, the CN 110, or other entities, but an embodiment of the disclosure is not limited thereto.

As described above, the transceiver 1310 may transmit and receive a signal. Accordingly, the transceiver 1310 may also be referred to as a transmitter, a receiver, or a communicator. Hereinafter, transmission and reception may be used in meanings that processes described above are performed by the transceiver 1310.

The storage 1320 may store data for operation of the base station 150 described above, e.g., basic programs, application programs, and configuration information. The storage 1320 may be configured in a volatile memory, a nonvolatile memory, or a combination of a volatile memory and a nonvolatile memory. Also, the storage 1320 may provide the stored data upon request by the controller 1330.

The controller 1330 may control overall operations of the base station 150. Also, the controller 1330 may control other components included in the base station 150 to perform operations for operating the base station 150. For example, the controller 1330 may transmit and receive signals via the transceiver 1310. Also, the controller 1330 may record and read data on and from the storage 1320. In this regard, the controller 1330 may include at least one processor. For example, the controller 1330 may include a communication processor (CP) for controlling communications and an application processor (AP) for controlling a higher layer such as an application program.

According to an embodiment of the disclosure, the controller 1330 may include the first control unit 310 and the second control unit 320. According to another embodiment of the disclosure, the controller 1330 may include the third control unit 410, the fourth control unit 420, and the fifth control unit 430. However, an embodiment of the disclosure is not limited thereto.

According to an embodiment of the disclosure, the first control unit 310 of the controller 1330 may perform data packing on bit unit information, map the bit unit information on which the data packing is performed to a resource region, and transmit the bit unit information and additional information to the second control unit 320.

Also, the second control unit 320 of the controller 1330 may receive the bit unit information and the additional information from the first control unit 310, modulate data based on the bit unit information, and transmit a signal generated based on the modulated data and the additional information to the terminal 140.

Figure 14:
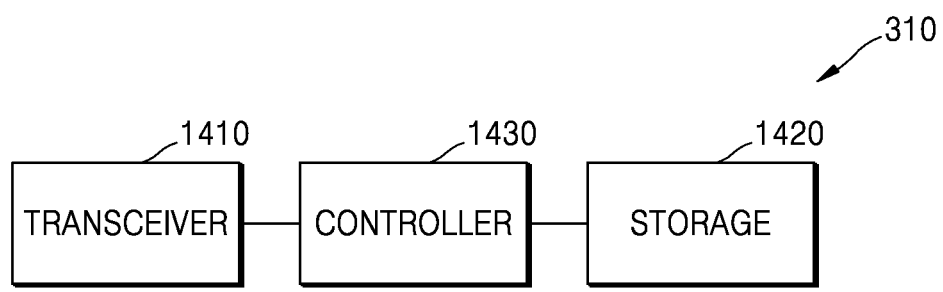
FIG. 14 is a block diagram of a configuration of a first control unit, according to an embodiment of the disclosure.

FIG. 14 is a block diagram of a configuration of a first control unit, according to an embodiment of the disclosure.

According to an embodiment of the disclosure, the first control unit of FIG. 14 may be the first control unit 310 of FIG. 3. According to another embodiment of the disclosure, the first control unit of FIG. 14 may be the third control unit 410, the fourth control unit 420, or a combination of the third control unit 410 and the fourth control unit 420 of FIG. 4A. Hereinafter, for convenience of description, the first control unit of FIG. 14 is described as the first control unit 310, but is not limited thereto.

Referring to FIG. 14, the first control unit 310 may include a transceiver 1410, a storage 1420, and a controller 1430.

The transceiver 1410 may perform functions for transmitting and receiving information. In particular, the transceiver 1410 may provide an interface for performing communication with other control units in a network. For example, the transceiver 1410 may provide a fronthaul I/F between the first control unit 310 and the second control unit 320.

Also, the transceiver 1410 may perform functions for transmitting and receiving signals in a wired communication network. The transceiver 1410 may include a wired interface for controlling direct connection between apparatuses via a transmission medium (for example, copper wire or optical fiber). For example, the transceiver 1410 may transmit an electric signal to another control unit or perform conversion between an electric signal and an optical signal via a path of a conductive material (for example, copper).

As described above, the transceiver 1410 may transmit and receive a signal. Accordingly, the transceiver 1410 may also be referred to as a transmitter, a receiver, or a communicator. Hereinafter, transmission and reception may be used in meanings that processes described above are performed by the transceiver 1410.

The storage 1420 may store data for operation of the first control unit 310 described above, e.g., basic programs, application programs, and configuration information. The storage 1420 may be configured in a volatile memory, a nonvolatile memory, or a combination of a volatile memory and a nonvolatile memory. Also, the storage 1420 may provide the stored data upon request by the controller 1430.

The controller 1430 may control overall operations of the first control unit 310. Also, the controller 1430 may control other components included in the first control unit 310 to perform operations for operating the first control unit 310. For example, the controller 1430 may transmit and receive signals via the transceiver 1410. Also, the controller 1430 may record and read data on and from the storage 1420. In this regard, the controller 1430 may include at least one processor. For example, the controller 1430 may include a CP for controlling communications and an AP for controlling a higher layer such as an application program.

According to an embodiment of the disclosure, the controller 1430 may perform data packing on bit unit information including information related to data transmitted by the base station 150 to the terminal 140 and information related to a modulation type. The controller 1430 may map the bit unit information on which the data packing is performed to a resource region for transmission of data. The controller 1430 may transmit the mapped bit unit information and additional information to the second control unit 320.

Figure 15:
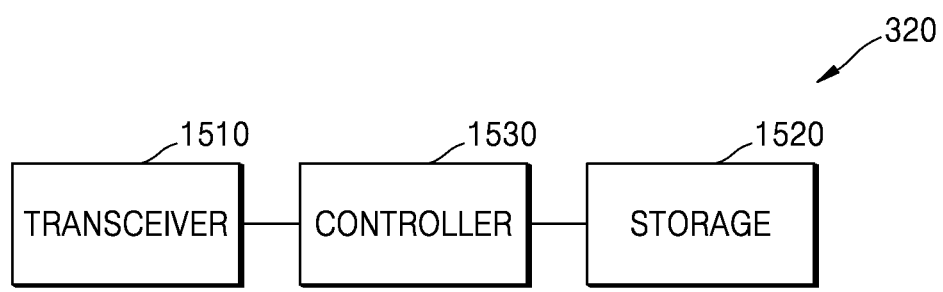
FIG. 15 is a block diagram of a configuration of a second control unit, according to an embodiment of the disclosure.

FIG. 15 is a block diagram of a configuration of a second control unit, according to an embodiment of the disclosure. The second control unit of FIG. 15 may be the second control unit 320 of FIG. 3. According to another embodiment of the disclosure, the second control unit of FIG. 15 may be the fifth control unit 430 of FIG. 4A. Hereinafter, for convenience of description, the second control unit of FIG. 15 is described as the second control unit 320, but is not limited thereto.

Referring to FIG. 15, the second control unit 320 may include a transceiver 1510, a storage 1520, and a controller 1530.

The transceiver 1510 may perform functions for transmitting and receiving information. In particular, the transceiver 1510 may provide an interface for performing communication with other control units in a network. For example, the transceiver 1510 may provide a fronthaul I/F between the first control unit 310 and the second control unit 320. For example, the transceiver 1510 may perform communication with the terminal 140 or other entities, but an embodiment of the disclosure is not limited thereto.

Also, the transceiver 1510 may perform functions for transmitting and receiving signals in a wired communication network. The transceiver 1510 may include a wired interface for controlling direct connection between apparatuses via a transmission medium (for example, copper wire or optical fiber). For example, the transceiver 1510 may transmit an electric signal to another control unit or perform conversion between an electric signal and an optical signal via a path of a conductive material (for example, copper).

As described above, the transceiver 1510 may transmit and receive a signal. Accordingly, the transceiver 1510 may also be referred to as a transmitter, a receiver, or a communicator. Hereinafter, transmission and reception may be used in meanings that processes described above are performed by the transceiver 1510.

The storage 1520 may store data for operation of the second control unit 320 described above, e.g., basic programs, application programs, and configuration information. The storage 1520 may be configured in a volatile memory, a nonvolatile memory, or a combination of a volatile memory and a nonvolatile memory. Also, the storage 1520 may provide the stored data upon request by the controller 1530.

The controller 1530 may control overall operations of the second control unit 320. Also, the controller 1530 may control other components included in the second control unit 320 to perform operations for operating the second control unit 320. For example, the controller 1530 may transmit and receive signals via the transceiver 1510. Also, the controller 1530 may record and read data on and from the storage 1520. In this regard, the controller 1530 may include at least one processor. For example, the controller 1530 may include a CP for controlling communications and an AP for controlling a higher layer such as an application program.

According to an embodiment of the disclosure, the controller 1530 may receive, from the first control unit 310, bit unit information on which data packing is performed and mapped to a resource region for transmission of data, and additional information. The controller 1530 may modulate the data based on the bit unit information on which the data packing is performed. The controller 1530 may generate a signal to be transmitted to the terminal 140, based on the modulated data and the additional information. The controller 1530 may transmit the generated signal to the terminal 140.

Pieces of information transmitted via an interface between CU and DU of the 3GPP standard, via an interface between O-DU and O-RU of the O-RAN standard, or via an interface between the first control unit 310 and the second control unit 320 according to an embodiment of the disclosure may be different from each other.

For example, in option 7-2 of the 3GPP standard, a communication interface (for example, fronthaul I/F) may be formed between CU and DU. Here, digital I/Q data may be transmitted from CU to DU. The digital I/Q data may denote data in which I/Q value to which a channel gain is applied is quantized. In response to the digital I/Q data being transmitted from CU to DU, a transmission bandwidth of the interface between CU and DU may be increased.

Also, in option 7-3 of the 3GPP standard, a communication interface (for example, fronthaul I/F) may be formed between CU and DU. Here, data encoded in bit units may be transmitted from CU to DU. In response to the digital I/Q data being transmitted, the transmission bandwidth of the interface between CU and DU may be decreased.

Also, for example, in option 7-2x of the O-RAN standard, a communication interface (for example, fronthaul I/F) may be formed between O-DU and O-RU. Here, I/Q compressed data may be transmitted from O-DU to O-RU. In option 7-2x, RE mapping may be performed before I/Q compression. According to an embodiment of the disclosure, the I/Q compression of option 7-2x may include one or more compression techniques. For example, the I/Q compression of option 7-2x may include a block floating compression technique, modulation compression technique, and mu-algorithm-based compression technique. According to an embodiment of the disclosure, in the block floating compression technique, data transmitted from O-DU to O-RU (or I/Q compressed data) may denote data obtained by performing modulation and channel gain to bit data. Also, according to an embodiment of the disclosure, in the modulation compression technique, data transmitted from O-DU to O-RU (or I/Q compressed data) may denote data encoded (or compressed) in bit units.

Also, for example, in a function split option according to embodiments of the disclosure, a communication interface may be formed between the first control unit 310 and the second control unit 320. Here, the first control unit 310 may be the third control unit 410, the fourth control unit 420, or a combination of the third control unit 410 and the fourth control unit 420, and the second control unit 320 may be the fifth control unit 430.

When the communication interface is formed between the first control unit 310 and the second control unit 320, the first control unit 310 may transmit bit unit information and additional information to the second control unit 320. Here, the bit unit information may denote that bits on which data packing is performed are mapped to a resource region.

As described above, in the function split option according to embodiments of the disclosure, the bit unit information may be transmitted from the first control unit 310 (for example, O-DU) to the second control unit 320 (for example, O-RU) in the same manner as option 7-2x of the O-RAN standard. Accordingly, a transmission bandwidth of the communication interface between the first control unit 310 and the second control unit 320 may be reduced.

The methods according to the embodiments of the disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the disclosure, the term 'computer program product' or 'computer-readable medium' is used to entirely refer to a medium such as a memory, a hard disk installed in a hard disk drive, or a signal. The 'computer program product' or 'computer-readable medium' provides software configured of instructions for performing function split according to the disclosure, to a computer system.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments of the disclosure provide an apparatus and method for effectively performing function split between control units in a base station in a wireless communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A base station for transmitting data to a terminal in a wireless communication system, the base station comprising:
   at least one transceiver; and
   at least one processor coupled with the at least one transceiver and comprising a first entity and a second entity,
   wherein the at least one processor is configured to:
      control the first entity to:
         receive the data for downlink transmission related with the terminal,
         encode the received data,
         scramble the encoded data,
         identify a resource mapped with the scrambled data, and
         transmit, to the second entity, the scrambled data with information indicating a modulation type for the data, or control the second entity to:
         receive, from the first entity, the scrambled data with the information indicating the modulation type for the data,
         modulate the scrambled data based on the information indicating the modulation type for the data, and
         transmit, to the terminal, a signal including the modulated data on the identified resource.

2. The base station of claim 1, wherein the information further comprises information related to a channel indicator for distinguishing the signal for each channel where the signal is transmitted.

3. The base station of claim 1, wherein the at least one processor is further configured to:
   control the first entity to:
      transmit additional information including at least one of information indicating a channel gain value of a channel where the signal is transmitted or information indicating a location of a mini-slot in the resource where the signal is transmitted, and
   wherein the location of the mini-slot in the resource where the signal is transmitted corresponds to the channel gain value of the channel where the signal is transmitted.

4. The base station of claim 3, wherein the at least one processor is further configured to:
   control the second entity to:
      identify the channel where the signal is transmitted from information related to channel indicator for distinguishing the signal for each channel where the signal is transmitted; and
      verify the channel gain value corresponding to the identified channel, based on the additional information.

5. The base station of claim 4, wherein the at least one processor is further configured to:
   control the second entity to:
      generate the signal based on the verified channel gain value.

6. A first entity, comprising:
   a transceiver; and
   a processor coupled to the transceiver and configured to:
      receive data for downlink transmission related with a terminal,
      encode the received data,
      scramble the encoded data,
      identify a resource mapped with the scrambled data, and
      transmit, to a second entity, the scrambled data with information indicating a modulation type for the data,
   wherein the scrambled data is modulated at the second entity based on the indicated modulation type and a signal including the modulated data on the identified resource is transmitted from the second entity to a terminal.

7. The first entity of claim 6, wherein the information further comprises information related to a channel indicator for distinguishing each channel between the second entity and the terminal.

8. The first entity of claim 6, wherein the processor is further configured to transmit additional information including at least one of information indicating a channel gain value of a channel between the second entity and the terminal or information indicating a location of a mini-slot in the resource, and wherein the location of the mini-slot in the resource region corresponds to the channel gain value of the channel between the second entity and the terminal.

9. A second entity, comprising:

a transceiver; and a processor coupled to the transceiver and configured to:
- receive, from a first entity, scrambled data with information indicating a modulation type for data,
- modulate the scrambled data based on the information indicating the modulation type for the data,
- identify a resource identified at the first entity, and
- transmit, to a terminal, a signal including the modulated data on the resource.

10. The second entity of claim 9, wherein the information further comprises information related to a channel indicator for distinguishing the signal for each channel where the signal is transmitted.

11. The second entity of claimer 9, wherein the processor is further configured to receive additional information including at least one of information indicating a channel gain value of a channel where the signal is transmitted or information indicating a location of a mini-slot in the resource where the signal is transmitted, and wherein the location of the mini-slot in the resource where the signal is transmitted corresponds to the channel gain value of the channel where the signal is transmitted.

12. The second entity of claim 11, wherein the processor is further configured to:
- identify the channel where the signal is transmitted from information related to a channel indicator for distinguishing the signal for each channel where the signal is transmitted, and
- verify the channel gain value corresponding to the identified channel, based on the additional information.

13. The second entity of claim 12, wherein the processor is further configured to generate the signal based on the verified channel gain value.

* * * * *